US007720682B2

(12) United States Patent
Stephanick et al.

(10) Patent No.: US 7,720,682 B2
(45) Date of Patent: May 18, 2010

(54) METHOD AND APPARATUS UTILIZING VOICE INPUT TO RESOLVE AMBIGUOUS MANUALLY ENTERED TEXT INPUT

(75) Inventors: James Stephanick, Seattle, WA (US); Richard Eyraud, Seattle, WA (US); David Jon Kay, Seattle, WA (US); Pim Van Meurs, Kenmore, WA (US); Ethan Bradford, Seattle, WA (US); Michael R. Longe, Seattle, WA (US)

(73) Assignee: Tegic Communications, Inc., Seattle, WA (US)

( * ) Notice: Subject to any disclaimer, the term of this patent is extended or adjusted under 35 U.S.C. 154(b) by 426 days.

(21) Appl. No.: 11/350,234

(22) Filed: Feb. 7, 2006

(65) Prior Publication Data

US 2006/0190256 A1   Aug. 24, 2006

Related U.S. Application Data

(63) Continuation-in-part of application No. 11/143,409, filed on Jun. 1, 2005, and a continuation-in-part of application No. 10/866,634, filed on Jun. 10, 2004, and a continuation-in-part of application No. 10/176,933, filed on Jun. 20, 2002, which is a continuation-in-part of application No. 09/454,406, filed on Dec. 3, 1999, now Pat. No. 6,646,573, and a continuation-in-part of application No. 11/043,506, filed on Jan. 25, 2005, now Pat. No. 7,319,957.

(60) Provisional application No. 60/651,302, filed on Feb. 8, 2005, provisional application No. 60/576,732, filed on Jun. 2, 2004, provisional application No. 60/544,170, filed on Feb. 11, 2004, provisional application No. 60/504,240, filed on Sep. 19, 2003, provisional application No. 60/110,890, filed on Dec. 4, 1998.

(51) Int. Cl.
  *G10L 15/00*   (2006.01)

(52) U.S. Cl. .................................. 704/252; 704/257
(58) Field of Classification Search ................. 704/252, 704/257, 270
See application file for complete search history.

(56) References Cited

U.S. PATENT DOCUMENTS 3,967,273 A    6/1976  Knowlton (Continued)

FOREIGN PATENT DOCUMENTS

EP         0319193        6/1989

(Continued)

OTHER PUBLICATIONS http://www.pinyin.info/readings/texts/ideographic_myth.html. The Ideographic Myth. 1984.

(Continued)

*Primary Examiner*—Angela A Armstrong
(74) *Attorney, Agent, or Firm*—Michael A. Glenn; Glenn Patent Group

(57) ABSTRACT

From a text entry tool, a digital data processing device receives inherently ambiguous user input. Independent of any other user input, the device interprets the received user input against a vocabulary to yield candidates such as words (of which the user input forms the entire word or part such as a root, stem, syllable, affix), or phrases having the user input as one word. The device displays the candidates and applies speech recognition to spoken user input. If the recognized speech comprises one of the candidates, that candidate is selected. If the recognized speech forms an extension of a candidate, the extended candidate is selected. If the recognized speech comprises other input, various other actions are taken.

26 Claims, 7 Drawing Sheets

U.S. PATENT DOCUMENTS

| | | | |
|---|---|---|---|
| 4,164,025 A | 8/1979 | Dubnowski et al. |
| 4,191,854 A | 3/1980 | Coles |
| 4,339,806 A | 7/1982 | Yoshida |
| 4,360,892 A | 11/1982 | Endfield |
| 4,396,992 A | 8/1983 | Hayashi et al. |
| 4,427,848 A | 1/1984 | Tsakanikas |
| 4,442,506 A | 4/1984 | Endfield |
| 4,464,070 A | 8/1984 | Hanft et al. |
| 4,481,508 A | 11/1984 | Kamei et al. |
| 4,544,276 A | 10/1985 | Horodeck |
| 4,586,160 A | 4/1986 | Amano et al. |
| 4,649,563 A | 3/1987 | Riskin |
| 4,661,916 A | 4/1987 | Baker et al. |
| 4,669,901 A | 6/1987 | Feng |
| 4,674,112 A | 6/1987 | Kondraske et al. |
| 4,677,659 A | 6/1987 | Dargan |
| 4,744,050 A | 5/1988 | Hirosawa et al. |
| 4,754,474 A | 6/1988 | Feinson |
| RE32,773 E | 10/1988 | Goldwasser et al. |
| 4,791,556 A | 12/1988 | Vilkaitis |
| 4,807,181 A | 2/1989 | Duncan, IV et al. |
| 4,817,129 A | 3/1989 | Riskin |
| 4,866,759 A | 9/1989 | Riskin |
| 4,872,196 A | 10/1989 | Royer et al. |
| 4,891,786 A | 1/1990 | Goldwasser |
| 4,969,097 A | 11/1990 | Levin |
| 5,018,201 A | 5/1991 | Sugawara |
| 5,031,206 A | 7/1991 | Riskin |
| 5,067,103 A | 11/1991 | Lapeyre |
| 5,109,352 A | 4/1992 | O'Dell |
| 5,131,045 A | 7/1992 | Roth |
| 5,133,012 A | 7/1992 | Nitta |
| 5,163,084 A | 11/1992 | Kim et al. |
| 5,200,988 A | 4/1993 | Riskin |
| 5,218,538 A | 6/1993 | Zhang |
| 5,229,936 A | 7/1993 | Decker et al. |
| 5,255,310 A | 10/1993 | Kim et al. |
| 5,258,748 A | 11/1993 | Jones |
| 5,289,394 A | 2/1994 | Lapeyre |
| 5,303,299 A | 4/1994 | Hunt et al. |
| 5,305,205 A | 4/1994 | Weber et al. |
| 5,339,358 A | 8/1994 | Danish et al. |
| 5,388,061 A | 2/1995 | Hankes |
| 5,392,338 A | 2/1995 | Danish et al. |
| 5,535,421 A | 7/1996 | Weinreich |
| 5,559,512 A | 9/1996 | Jasinski et al. |
| 5,642,522 A | 6/1997 | Zaenen et al. |
| 5,664,896 A | 9/1997 | Blumberg |
| 5,680,511 A | 10/1997 | Baker et al. |
| 5,748,512 A | 5/1998 | Vargas |
| 5,786,776 A | 7/1998 | Kisaichi et al. |
| 5,797,098 A | 8/1998 | Schroeder et al. |
| 5,818,437 A | 10/1998 | Grover et al. |
| 5,825,353 A | 10/1998 | Will |
| 5,828,991 A | 10/1998 | Skiena et al. |
| 5,847,697 A | 12/1998 | Sugimoto |
| 5,855,000 A | 12/1998 | Waibel et al. |
| 5,896,321 A | 4/1999 | Miller et al. |
| 5,917,890 A | 6/1999 | Brotman et al. |
| 5,917,941 A | 6/1999 | Webb et al. |
| 5,926,566 A | 7/1999 | Wang et al. |
| 5,936,556 A | 8/1999 | Sakita |
| 5,937,380 A | 8/1999 | Segan |
| 5,937,422 A | 8/1999 | Nelson et al. |
| 5,945,928 A * | 8/1999 | Kushler et al. ................. 341/28 |
| 5,952,942 A | 9/1999 | Balakrishnan et al. |
| 5,953,541 A | 9/1999 | King et al. |
| 5,960,385 A | 9/1999 | Skiena et al. |
| 5,963,671 A | 10/1999 | Comerford et al. |
| 5,999,950 A | 12/1999 | Krueger et al. |
| 6,005,498 A | 12/1999 | Yang et al. |
| 6,009,444 A | 12/1999 | Chen |
| 6,011,554 A | 1/2000 | King et al. |
| 6,041,323 A | 3/2000 | Kubota |
| 6,044,347 A | 3/2000 | Abella et al. |
| 6,054,941 A | 4/2000 | Chen |
| 6,073,101 A | 6/2000 | Maes |
| 6,098,086 A | 8/2000 | Krueger et al. |
| 6,104,317 A | 8/2000 | Panagrossi |
| 6,120,297 A | 9/2000 | Morse, III et al. |
| 6,130,628 A | 10/2000 | Schneider-Hufschmidt et al. |
| 6,169,538 B1 | 1/2001 | Nowlan et al. |
| 6,172,625 B1 | 1/2001 | Jin et al. |
| 6,178,401 B1 | 1/2001 | Franz et al. |
| 6,204,848 B1 | 3/2001 | Nowlan et al. |
| 6,208,966 B1 | 3/2001 | Bulfer |
| 6,219,731 B1 | 4/2001 | Gutowitz |
| 6,223,059 B1 | 4/2001 | Haestrup |
| 6,286,064 B1 | 9/2001 | King et al. |
| 6,304,844 B1 | 10/2001 | Pan et al. |
| 6,307,548 B1 | 10/2001 | Flinchem et al. |
| 6,307,549 B1 | 10/2001 | King et al. |
| 6,362,752 B1 | 3/2002 | Guo et al. |
| 6,363,347 B1 | 3/2002 | Rozak |
| 6,377,965 B1 | 4/2002 | Hachamovitch et al. |
| 6,392,640 B1 | 5/2002 | Will |
| 6,421,672 B1 | 7/2002 | McAllister et al. |
| 6,424,743 B1 | 7/2002 | Ebrahimi |
| 6,502,118 B1 | 12/2002 | Chatterjee |
| 6,542,170 B1 | 4/2003 | Williams et al. |
| 6,559,778 B1 | 5/2003 | Hillmering |
| 6,567,075 B1 | 5/2003 | Baker et al. |
| 6,574,597 B1 | 6/2003 | Mohri et al. |
| 6,584,179 B1 | 6/2003 | Fortier et al. |
| 6,633,846 B1 | 10/2003 | Bennett et al. |
| 6,636,162 B1 | 10/2003 | Kushler et al. |
| 6,646,573 B1 | 11/2003 | Kushler et al. |
| 6,684,185 B1 * | 1/2004 | Junqua et al. ................. 704/243 |
| 6,686,852 B1 | 2/2004 | Guo |
| 6,711,290 B2 | 3/2004 | Sparr et al. |
| 6,728,348 B2 | 4/2004 | Denenberg et al. |
| 6,734,881 B1 | 5/2004 | Will |
| 6,738,952 B1 | 5/2004 | Yamamuro |
| 6,751,605 B2 | 6/2004 | Gunji et al. |
| 6,757,544 B2 | 6/2004 | Rangarajan et al. |
| 6,801,190 B1 | 10/2004 | Robinson et al. |
| 6,801,659 B1 | 10/2004 | O'Dell |
| 6,807,529 B2 | 10/2004 | Johnson et al. |
| 6,864,809 B2 | 3/2005 | O'Dell et al. |
| 6,885,317 B1 | 4/2005 | Gutowitz |
| 6,912,581 B2 | 6/2005 | Johnson et al. |
| 6,934,564 B2 | 8/2005 | Laukkanen et al. |
| 6,947,771 B2 | 9/2005 | Guo et al. |
| 6,955,602 B2 | 10/2005 | Williams |
| 6,956,968 B1 | 10/2005 | O'Dell et al. |
| 6,973,332 B2 | 12/2005 | Mirkin et al. |
| 6,982,658 B2 | 1/2006 | Guo |
| 6,985,933 B1 | 1/2006 | Singhal et al. |
| 7,006,820 B1 | 2/2006 | Parker et al. |
| 7,020,849 B1 | 3/2006 | Chen |
| 7,027,976 B1 | 4/2006 | Sites |
| 7,057,607 B2 | 6/2006 | Mayoraz et al. |
| 7,061,403 B2 | 6/2006 | Fux |
| 7,075,520 B2 | 7/2006 | Williams |
| 7,095,403 B2 | 8/2006 | Lyustin et al. |
| 7,139,430 B2 | 11/2006 | Sparr et al. |
| 7,152,213 B2 | 12/2006 | Pu et al. |
| 7,256,769 B2 | 8/2007 | Pun et al. |
| 7,257,528 B1 | 8/2007 | Ritchie et al. |
| 7,272,564 B2 | 9/2007 | Phillips et al. |
| 7,313,277 B2 | 12/2007 | Morwing et al. |
| 7,349,576 B2 | 3/2008 | Hotsberg |
| 7,389,235 B2 | 6/2008 | Dvorak |
| 7,395,203 B2 | 7/2008 | Wu et al. |

| | | | |
|---|---|---|---|
| 7,437,001 B2 | 10/2008 | Morwing et al. | |
| 7,466,859 B2 | 12/2008 | Chang et al. | |
| 2002/0038207 A1 | 3/2002 | Mori et al. | |
| 2002/0072395 A1 | 6/2002 | Miramontes | |
| 2002/0135499 A1 | 9/2002 | Guo | |
| 2002/0145587 A1 | 10/2002 | Watanabe | |
| 2002/0152075 A1 | 10/2002 | Kung et al. | |
| 2002/0188448 A1 | 12/2002 | Goodman et al. | |
| 2003/0011574 A1 | 1/2003 | Goodman | |
| 2003/0023420 A1 | 1/2003 | Goodman | |
| 2003/0023426 A1 | 1/2003 | Pun et al. | |
| 2003/0054830 A1 | 3/2003 | Williams et al. | |
| 2003/0078038 A1 | 4/2003 | Kurosawa et al. | |
| 2003/0095102 A1 | 5/2003 | Kraft | |
| 2003/0104839 A1 | 6/2003 | Kraft et al. | |
| 2003/0119561 A1 | 6/2003 | Hatch et al. | |
| 2003/0144830 A1 | 7/2003 | Williams | |
| 2003/0179930 A1 | 9/2003 | O'Dell et al. | |
| 2003/0193478 A1 | 10/2003 | Ng | |
| 2004/0049388 A1 | 3/2004 | Roth et al. | |
| 2004/0067762 A1 | 4/2004 | Balle | |
| 2004/0127197 A1 | 7/2004 | Roskind | |
| 2004/0127198 A1 | 7/2004 | Roskind et al. | |
| 2004/0135774 A1 | 7/2004 | La Monica | |
| 2004/0153963 A1 | 8/2004 | Simpson et al. | |
| 2004/0153975 A1 | 8/2004 | Williams et al. | |
| 2004/0155869 A1 | 8/2004 | Robinson et al. | |
| 2004/0163032 A1 | 8/2004 | Guo et al. | |
| 2004/0169635 A1 | 9/2004 | Ghassabian | |
| 2004/0201607 A1 | 10/2004 | Mulvey et al. | |
| 2004/0259598 A1 | 12/2004 | Wagner et al. | |
| 2005/0017954 A1 | 1/2005 | Kay et al. | |
| 2005/0114770 A1 | 5/2005 | Sacher et al. | |
| 2006/0010206 A1 | 1/2006 | Apacible et al. | |
| 2006/0129928 A1 | 6/2006 | Qiu | |
| 2006/0136408 A1 | 6/2006 | Weir et al. | |
| 2006/0155536 A1 | 7/2006 | Williams et al. | |
| 2006/0158436 A1 | 7/2006 | LaPointe et al. | |
| 2006/0173807 A1 | 8/2006 | Weir et al. | |
| 2006/0193519 A1 | 8/2006 | Sternby | |
| 2006/0236239 A1 | 10/2006 | Simpson et al. | |
| 2006/0239560 A1 | 10/2006 | Sternby | |
| 2007/0094718 A1 | 4/2007 | Simpson | |
| 2007/0203879 A1 | 8/2007 | Templeton-Steadman et al. | |
| 2007/0276814 A1 | 11/2007 | Williams | |
| 2007/0285397 A1 | 12/2007 | LaPointe et al. | |
| 2008/0130996 A1 | 6/2008 | Sternby | |

FOREIGN PATENT DOCUMENTS

| | | |
|---|---|---|
| EP | 0464726 | 1/1992 |
| EP | 0540147 | 5/1993 |
| EP | 0313975 | 12/1994 |
| EP | 0651315 | 5/1995 |
| EP | 0660216 | 6/1995 |
| EP | 0732646 | 9/1996 |
| EP | 0751469 | 8/2002 |
| EP | 1 296216 | 3/2003 |
| EP | 1296216 | 3/2003 |
| EP | 1031913 | 4/2003 |
| EP | 1035712 | 4/2003 |
| EP | 1320023 | 6/2003 |
| EP | 1324573 | 7/2003 |
| EP | 1 347362 | 9/2003 |
| EP | 1347361 | 9/2003 |
| GB | 2298166 | 8/1996 |
| GB | 2383459 | 6/2003 |
| JP | A 1990-117218 | 5/1990 |
| JP | A 1993-265682 | 10/1993 |
| JP | 8006939 | 1/1996 |
| JP | A 1997-114817 | 5/1997 |
| JP | A 1997-212503 | 8/1997 |
| JP | W 2001-509290 | 7/2001 |
| JP | A 2002-351862 | 12/2002 |
| WO | WO 82/00442 | 2/1982 |
| WO | WO 90/07149 | 6/1990 |
| WO | WO 96/27947 | 9/1996 |
| WO | WO 97/04580 | 2/1997 |
| WO | WO 97/05541 | 2/1997 |
| WO | WO 03/058420 | 7/2003 |
| WO | WO2004/111812 | 12/2004 |
| WO | WO 2004/111812 | 12/2004 |
| WO | WO 2004/111871 | 12/2004 |
| WO | WO 2006/026908 | 3/2006 |

OTHER PUBLICATIONS http://www.ling.upenn.edu/courses/Fall_2003/ling001/reading_writing.html. What is writing? Linguistics 001. Lecture 19. Reading and Writing. 2003.
http://www.zicorp.com/ezitap.htm.
http://www.tapless.biz/.
http://www.wordlogic.com/products-predictive-keyboard-handheld-prediction.asp.
http://pitecan.com/OpenPOBox/info/index.html.
http://www.nuance.com/.
Suhm, B., et al. "Multimodal Error Correction for Speech User Interfaces" ACM Transactions on Computer-Human Interaction. vol. 8. Mar. 2001.
Oviatt, S. "Mutual Disambiguation of Recognition Errors in a Multimodal Architecture." Chi 99. May 15-20, 1999.
Dey, A.K. and Abowd, G.D. (1999). Towards a better understanding of context and context-awareness. GVU Technical Report GIT-GVU-99-22, GVU Center, 1999.
P.Coppola, et al. MoBe: a framework for context-aware mobile applications. In: Proc. of Workshop on Context Awareness for Proactive Systems (CAPS2005), Helsinki University Press, 2005; ISBN: 952-10-2518-2.
A. Schmidt, et al. Advanced interaction in context. In Proceedings of First International Symposium on Handheld and Ubiquitous Computing, pp. 89-101, Karlsruhe, Germany, Sep. 1999.
D.P. Siewiorek, et al. SenSay: a context-aware mobile phone. In Proceedings of the 7th IEEE International Symposium on Wearable Computers, pp. 248-249. IEEE Press, 2003.
Ajioka, Y, Anzai, Y., "Prediction of Next Alphabets and Words of Four Sentences by Adaptive Injunctions"; IJCNN-91- Seattle: Intnl Joint Conference on Neural Networks (Cat. No. 91CH3049-4) p. 897, vol. 2; IEEE, NY, NY 1991 USA.
Martin, T.Azvine, B., "Learning User Models for an Intelligent Telephone Assistant"; Proceedings Joint $9^{th}$ IFSA World Congress and $20^{th}$ NAFIPS Intnl. Conf. (Cat. No. 01TH8569) Part vol. 2, p. 669-674 vol. 2; IEEE 2001, Piscataway, NJ, USA.
Yang, Y., Pedersen, J., "A Comparative Study on Feature Selection in Text Categorization"; Carnegie Mellon University: yiming@cs.cmu.edu; jpederse@verity.com.
Arnott, J.L., et al; *Probabilistic Character Disambiguation for Reduced Keyboards Using Small Text Samples*; Dept. Math & Comp. Sci.; Univ of Dundee, Dundee, Tayside, Scotland; AAc Augmentative and Alternative Communication; vol. 8, Sep. 1992; Copyright 1992 by ISAAC.
Oommen, B. John, et al.; "String Taxonomy Using Learning Automata"; Apr. 1997; IEEE Transactions on Systems, Mand and Cybernetics—Part B: Cybernetics, vol. 27 No. 20 pp. 354-365.
Lesher, Gregory W. et al.; "Optimal Character Arrangements for Ambiguous Keyboards"; Dec. 1998; IEEE Transactions on Rehabilitation Engineering, vol. 6, No. 4, pp. 415-423.
Oommen, B. John, et al.; "String Taxonomy Using Learning Automata"; Apr. 1997; IEEE Transactions on Systems, Mand and Cybernetics—Part B: Cybernetics, vol. 27 No. 20 pp. 354-365.
Lesher, Gregory W. et al.; "Optimal Character Arrangements for Ambiguous Keyboards"; Dec. 1998; IEEE Transactions on Rehabilitation Engineering, vol. 6, No. 4, pp. 415-423.
"Latest Philips Wireless Handset Ships With T9 Text Input in China", Business Wire, Nov. 9, 1999, pp. 1-2 (downloaded from: www.businesswire.com/webbox/bw.110999/193130342.htm).

Butts, L., Cockburn, A., "An Evaluation of Mobile Phone Text Input Methods", University of Canterbury, Dept of Computer Science, Christchurch, New Zealand AUIC2002, Melbourne Australia, Conferences in Research and Practice in Information Technology, vol. 7; Copyright 2001, Australian Computer Society.

Cockburn, A., Siresena, "Evaluating Mobile Text Entry with Fastap ™ Keyboard"; University of Canterbury, Dept. of Computer Science, Christchurch, New Zealand; ans26@cosc.,canterbury.ac.nz.

Damasco, Patrick W., et al., "Generating Text From Compressed Input: An Intelligent Interface for People with Sever Motor Impairments", Communications of the ACM, vol. 35 No. 5, May 1992, pp. 68-78.

Foulds, R., et al. "Lexical Prediction Techniques Applied to Reduce Motor Requirements for Augmentative Communication," RESNA 10th Annula Conference, San Jose, California, 1987, pp. 115-117.

Foulds, R., et al., "Statistical Disambiguation of Multi-Character Keys Applied to Reduce Motor Requirements for Augmentative and Alternative Communication," AAC Augmentative and Alternative Communication (1987), pp. 192-195.

Gavalda, M. "Epiphenomenal Grammar Acquisition with GSG"; Interactive Systems Inc., Pittsburgh, PA USA marsal@interactivesys.com.

IBM Technical Disclosure Bulletin, "Speed Keyboard for Data Processor," vol. 23, 3 pages, Jul. 1980. IBM Corp., 1993.

James, Christina L., et al., "Text Input for Mobile Devices: Comparing Model Prediction to Actual Performance", SIGCHI '01, Seattle, WA, Mar. 31-Apr. 4, 2001, pp. 365-371 [ACM 1-58113-327-8/01/0003].

James, Christina, et al., "Bringing Text Input Beyond the Desktop", CHI 2000, Seattle, WA, Apr. 1-6, 2000, pp. 49-50.

Kamphuis, H., et al., "Katdas; A Small Number of Keys Direct Access System," RESNA 12th Annual Conference, New Orleans, Louisiana, 1989, pp. 278-279.

King, M.T., "JustType-Efficient Communication with Eight Keys," Proceedings of the RESNA '95 Annual Conference, Vancouver, BC, Canada, 1995, 3 pages.

Kreifeldt, J.G., et al., "Reduced Keyboard Designs Using Disambiguation," Proceedings of the Human Factors Society 33rd Annual Meeting, 1989, pp. 441-444.

Kronlid, F., Nilsson, V. "TreePredict, Improving Text Entry on PDA's"; Computational Linguistics, Goteborg University, c15fkron@cling.gu.se; Victoria@viktoria.informatics.gu.se.

Kushler, Cliff, "AAC Using A Reduced Keyboard", downloaded from: www.dinf.ne.jp/doc/english/Us_Eu/conf/csun_98/csun98_140.htm, Web Posted Mar. 3, 1998, pp. 1-4.

Levine, S.H., "An Adaptive Approach to Optimal Keyboard Design for Nonvocal Communication," IEEE, 1985, pp. 334-337.

Levine, S.H., et al., "Adaptive Technique for Customized Interface Design With Application to Nonvocal Communication," RESNA 9th Annual Conference, Minneapolis, Minnesota, 1986, pp. 399-401.

Levine, S.H., et al., "Computer Disambiguation of Multi-Character Key Text Entry: An Adaptive Design Approach," IEEE, 1986, pp. 298-301.

Levine, S.H., et al., "Multi-Character Key Text Entry Using Computer Disambiguation," RESNA 10th Annual Conference, San Jose, California, 1987, pp. 177-178.

MacKenzie, I. Scott, et al., "LetterWise: Prefix-based Disambiguation for Mobile Text Input", UIST '01, Orlando, FL, Nov. 11-14, 2001, pp. 111-120 [ACM 1-58113-438-x/01/11].

Matias, E., et al., "Half-Qwerty: Typing With One Hand Using Your Two-Handed Skills," Conference Companion, CHI '94 (Apr. 24-28, 1994), pp. 51-52.

Matsui, "POBox: An efficient Text input Method for Handheld and Ubiquitous Computers"; Sony Computer Science Labs inc. 3-14-13 Higashi-Gotanda, Shinagawa Tokyo 141-0022, Japan.

Minneman, S.L., "A Simplified Touch-Tone Telecommunication Aid for Deaf and Hearing Impaired Individuals," RESNA 8th Annual Conference, Memphis Tennessee, 195, pp. 209-211.

News Release from Zi Corporation, "Zi Claims Second Patent Victory Against Tegic Communications, a unit of AOL Time Warner", Mar. 14, 2002, pp. 1-2 (downloaded from: www.zicorp.com/pressreleases/031402.html).

Oommen, B.J., et al., "Correction to 'An Adaptive Learning Solution to the Keyboard Optimization Problem'." IEEE Transactions on Systems, Man and Cybernetics, vol. 22, No. 5 (Oct. 1992) pp. 1233-1243.

Press Release from Tegic Communications, "America Online, Inc. Acquires Tegic Communications", Dec. 1, 1999, pp. 1-3 (downloaded from: www.tegic.com/pressreleases/pr_aolacquisition.html).

Rosa, J. "Next Word Prediction in a Connectional Distributed Representation System"; 2002 IEEEE Intnl Conference on Systems, man and Cybernetics; Conf. Proceedings (Cat. No. 02CH37349) Part vol. 3, p. 6, Yasmine Hammamet, Tunisia, Oct. 2002.

Rosa, J., "A Biologically Motivated Connectionist System for Predicting the Next Word in Natural Language Sentences", 2002 IEEEE Intnl Conference on Systems, man and Cybernetics; Conf. Proceedings (Cat. No. 02CH37349) Part vol. 4, p. 6, Yasmine Hammamet, Tunisia, Oct. 2002.

Shieber, S., Baker, E., "Abbreviated Text Input", Harvard University, Cambridge, MA, USA shieber@deas.harvard.edu_ellie@eecs.harvard.edu.

Silfverberg, Miika, et al., "Bringing Text Input Beyond the Desktop", CHI 2000, The Hague, Amsterdam, Apr. 1-6, 2000, pp. 9-16 [ACM 1-58113-216-6/00/04].

Smith, Sidney L., et al., "Alphabetic Data Entry Via the Touch-Tone Pad: A Comment," Human Factors, 13(2), Apr. 1971, pp. 189-190.

Sugimoto, M., et al., "SHK: Single Hand Key Card for Mobile Devices," CHI 1996 (Apr. 13-18, 1996), pp. 7-8.

Sugimoto, Masakatsu, "Single-Hand Input Scheme for English and Japanese Text", Fujitsu Sci. Tech.J., vol. 33 No. 2, Dec. 1997, pp. 189-195.

Summary Judgment Orders, Zi Corporation, Inc. v. Tegic Communications, Inc., Mar. 13, 2002, pp. 1-7 (downloaded from: www.zicorp.com/pressreleases/031402.html).

Swiffin, A.L., et al., "Adaptive and Predictive Techniques in A Communications Prosthesis," AAC Augmentative and Alternative Communication. (1987), pp. 181-191.

Swiffin, A.L., et al., "PAL: An Effort Effidient Protable Communication Aid and Keyboard Emulator," RESNA 8th Annual Conference, Memphis, Tennessee, 1985, pp. 197, 199.

Tygran, Amalyan, "T9 or Text Predicative Input in Mobile Telephones", Business Wire, Jul. 23, 2001, pp. 1-5 (downloaded from: web.archive.org/wweb/20010723054055/http://www.digit-life.com/articles/mobilet9/).

Witten, I.H., Principles of Computer Speech, New York: Academic Press, (1982), pp. 246-253.

www.motorola.com/lexicus/html/itap_FAQ.html—Website printout from Lexicus.

www.yorku.ca/mack/hci3.html—Website Printout from Text Entry for Mobile Computing.

Xu, Jinxi, et al., "Corpus-Based Stemming Using Cooccurrence of Word Variants", ACM Transactions on Information Systems, vol. 16 No. 1, Jan. 1998, pp. 61-81 [ACM 1046-8188/98/0100-0061].

Zernik, U., "Language Acquisition: Coping with Lexical Gaps", Artificial Intelligence Program, GE R&D Center, Schenectady, NY USA.

* cited by examiner

400

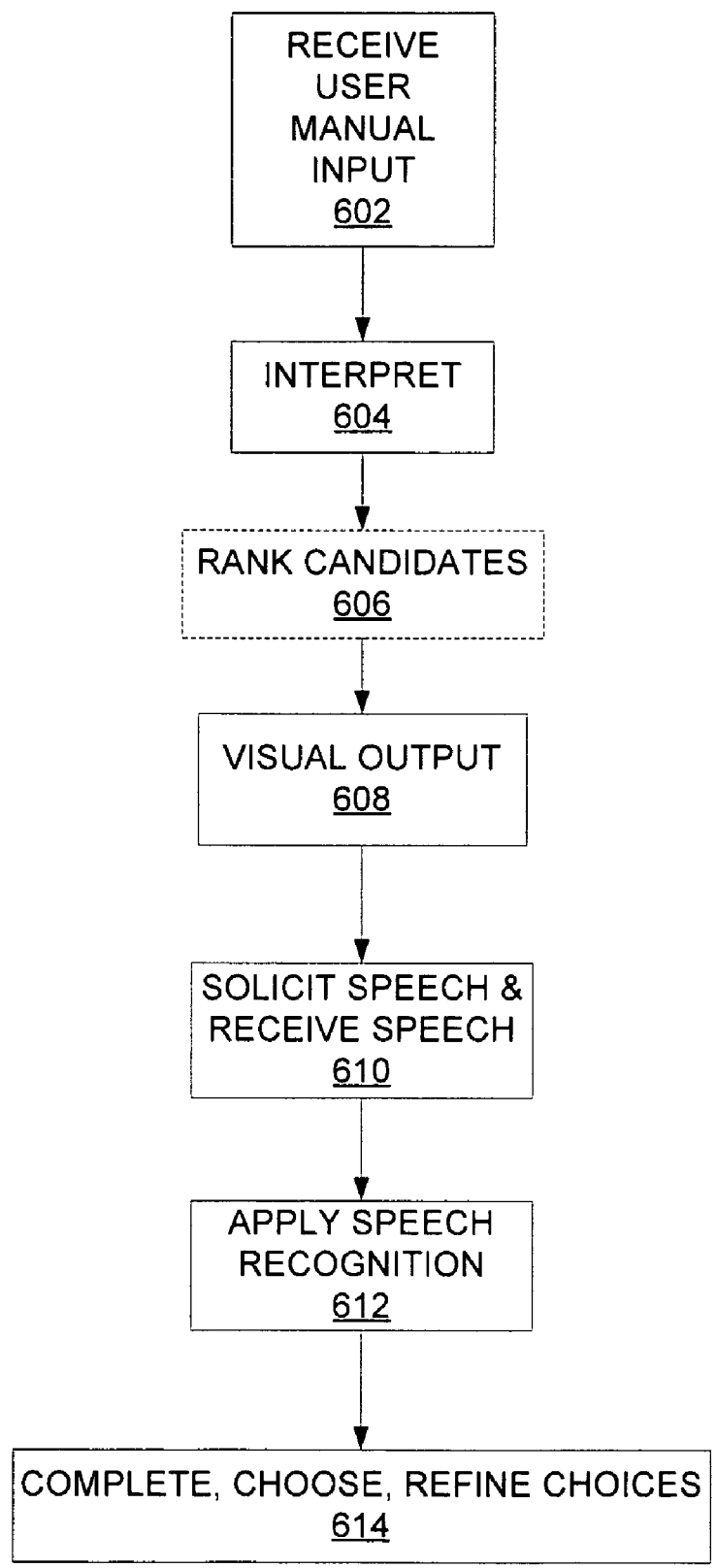

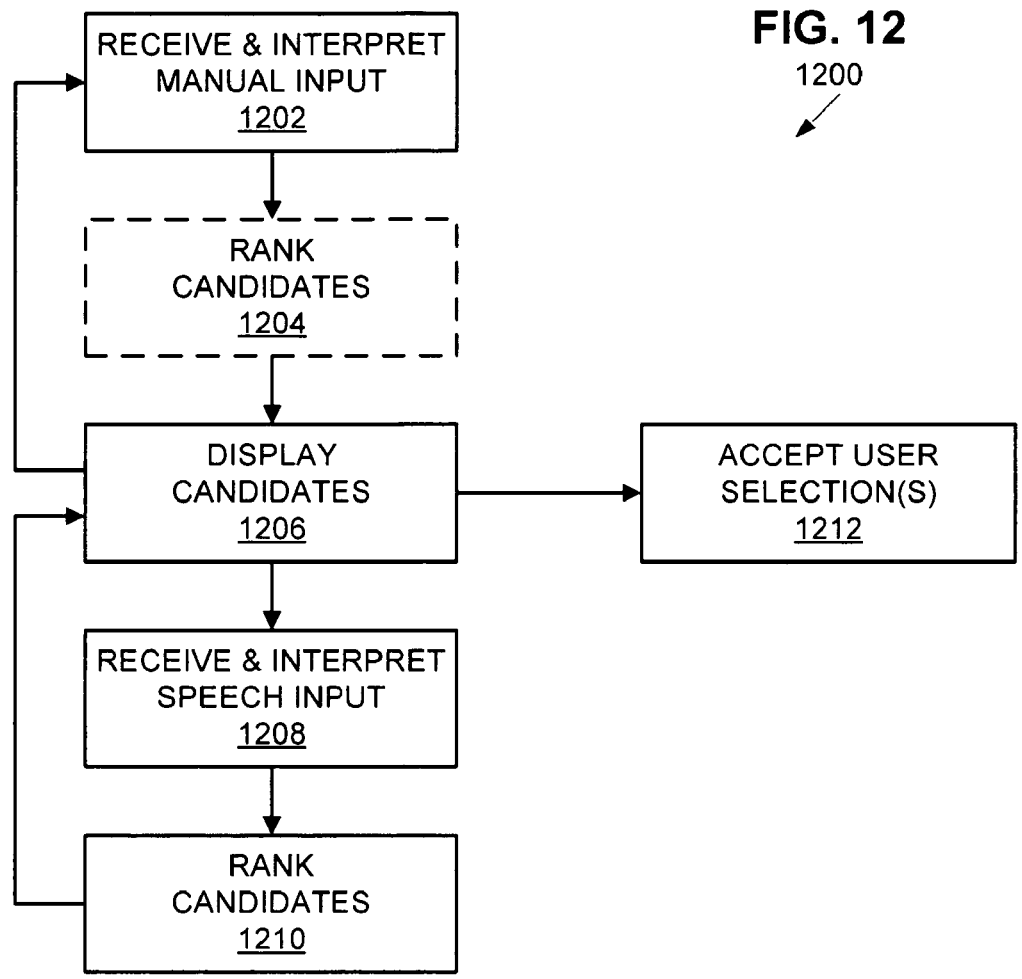

US 7,720,682 B2

METHOD AND APPARATUS UTILIZING VOICE INPUT TO RESOLVE AMBIGUOUS MANUALLY ENTERED TEXT INPUT

CROSS REFERENCE TO RELATED APPLICATIONS

This application is a continuation-in-part of the following application and claims the benefit thereof under 35 USC 120: U.S. application Ser. No. 11/143,409 filed Jun. 1, 2005. The foregoing application (1) claims the 35 USC 119 benefit of U.S. Provisional Application No. 60/576,732 filed Jun. 2, 2004 and (2) claims the 35 USC 119 benefit under 35 USC 119 of U.S. Provisional Application No. 60/651,302 filed Feb. 8, 2005 and (2) is a continuation-in-part of U.S. application Ser. No. 10/866,634 filed Jun. 10, 2004 (which claims the benefit of U.S. Provisional Application 60/504,240 filed Sep. 19, 2003 and is also a continuation-in-part of U.S. application Ser. No. 10/176,933 filed Jun. 20, 2002 which is a continuation-in-part of U.S. application Ser. No. 09/454,406, filed Dec. 3, 1999, now U.S. Pat. No. 6,646,573 which itself claims priority based upon U.S. Provisional Application No. 60/110,890 filed Dec. 4, 1998) and (2) is a continuation-in-part of U.S. application Ser. No. 11/043,506 filed Jan. 25, 2005 now U.S. Pat. No. 7,319,957 (which claims the benefit of U.S. Provisional Application No. 60/544,170 filed Feb. 11, 2004). The foregoing applications in their entirety are incorporated by reference.

BACKGROUND

1. Technical Field

The invention relates to user manual entry of text using a digital data processing device. More particularly, the invention relates to computer driven operations to supplement a user's inherently ambiguous, manual text entry with voice input to disambiguate between different possible interpretations of the user's text entry.

2. Description of Related Art

For many years, portable computers have been getting smaller and smaller. Tremendous growth in the wireless industry has produced reliable, convenient, and nearly commonplace mobile devices such as cell phones, personal digital assistants (PDAs), global positioning system (GPS) units, etc. To produce a truly usable portable computer, the principle size-limiting component has been the keyboard.

To input data on a portable computer without a standard keyboard, people have developed a number of solutions. One such approach has been to use keyboards with less keys ("reduced-key keyboard"). Some reduced keyboards have used a 3-by-4 array of keys, like the layout of a touch-tone telephone. Although beneficial from a size standpoint, reduced-key keyboards come with some problems. For instance, each key in the array of keys contains multiple characters. For example, the "2" key represents "a" and "b" and "c". Accordingly, each user-entered sequence is inherently ambiguous because each keystroke can indicate one number or several different letters.

T9® text input technology is specifically aimed at providing word-level disambiguation for reduced keyboards such as telephone keypads. T9 Text Input technology is described in various U.S. Patent documents including U.S. Pat. No. 5,818, 437. In the case of English and other alphabet-based words, a user employs T9 text input as follows:

When inputting a word, the user presses keys corresponding to the letters that make up that word, regardless of the fact that each key represents multiple letters. For example, to enter the letter "a," the user enters the "2" key, regardless of the fact that the "2" key can also represent "b" and "c." T9 text input technology resolves the intended word by determining all possible letter combinations indicated by the user's keystroke entries, and comparing these to a dictionary of known words to see which one(s) make sense.

Beyond the basic application, T9 Text Input has experienced a number of improvements. Moreover, T9 text input and similar products are also available on reduced keyboard devices for languages with ideographic rather than alphabetic characters, such as Chinese. Still, T9 text input might not always provide the perfect level of speed and ease of data entry required by every user.

As a completely different approach, some small devices employ a digitizing surface to receive users' handwriting. This approach permits users to write naturally, albeit in a small area as permitted by the size of the portable computer. Based upon the user's contact with the digitizing surface, handwriting recognition algorithms analyze the geometric characteristics of the user's entry to determine each character or word. Unfortunately, current handwriting recognition solutions have problems. For one, handwriting is generally slower than typing. Also, handwriting recognition accuracy is difficult to achieve with sufficient reliability. In addition, in cases where handwriting recognition algorithms require users to observe predefined character stroke patterns and orders, some users find this cumbersome to perform or difficult to learn.

A completely different approach for inputting data using small devices without a full-sized keyboard has been to use a touch-sensitive panel on which some type of keyboard overlay has been printed, or a touch-sensitive screen with a keyboard overlay displayed. The user employs a finger or a stylus to interact with the panel or display screen in the area associated with the desired key or letter. With a small overall size of such keyboards, the individual keys can be quite small. This can make it difficult for the average user to type accurately and quickly.

A number of built-in and add-on products offer word prediction for touch-screen and overlay keyboards. After the user carefully taps on the first letters of a word, the prediction system displays a list of the most likely complete words that start with those letters. If there are too many choices, however, the user has to keep typing until the desired word appears or the user finishes the word. Text entry is slowed rather than accelerated, however, by the user having to switch visual focus between the touch-screen keyboard and the list of word completions after every letter. Consequently, some users can find the touch-screen and overlay keyboards to be somewhat cumbersome or error-prone.

In view of the foregoing problems, and despite significant technical development in the area, users can still encounter difficulty or error when manually entering text on portable computers because of the inherent limitations of reduced-key keypads, handwriting digitizers, and touch-screen/overlay keyboards.

SUMMARY OF THE INVENTION

From a text entry tool, a digital data processing device receives inherently ambiguous user input. Independent of any other user input, the device interprets the received user input against a vocabulary to yield candidates, such as words (of which the user input forms the entire word or part such as a root, stem, syllable, affix) or phrases having the user input as one word. The device displays the candidates and applies speech recognition to spoken user input. If the recognized speech comprises one of the candidates, that candidate is selected. If the recognized speech forms an extension of a candidate, the extended candidate is selected. If the recognized speech comprises other input, various other actions are taken.

BRIEF DESCRIPTION OF FIGURES

FIG. 6 is a flowchart of a computer executed sequence for utilizing user voice input to resolve ambiguous manually entered text input.

FIG. 12 is a flowchart of a computer executed sequence for using voice input to resolve ambiguous manually entered input of ideographic characters.

DETAILED DESCRIPTION

Introduction

One aspect of the disclosure concerns a handheld mobile device providing user operated text entry tool. This device may be embodied by various hardware components and interconnections, with one example being described by FIG. 1. The handheld mobile device of FIG. 1 includes various processing subcomponents, each of which may be implemented by one or more hardware devices, software devices, a portion of one or more hardware or software devices, or a combination of the foregoing. The makeup of these subcomponents is described in greater detail below, with reference to an exemplary digital data processing apparatus, logic circuit, and signal bearing media.

Overall Structure

Figure 1:
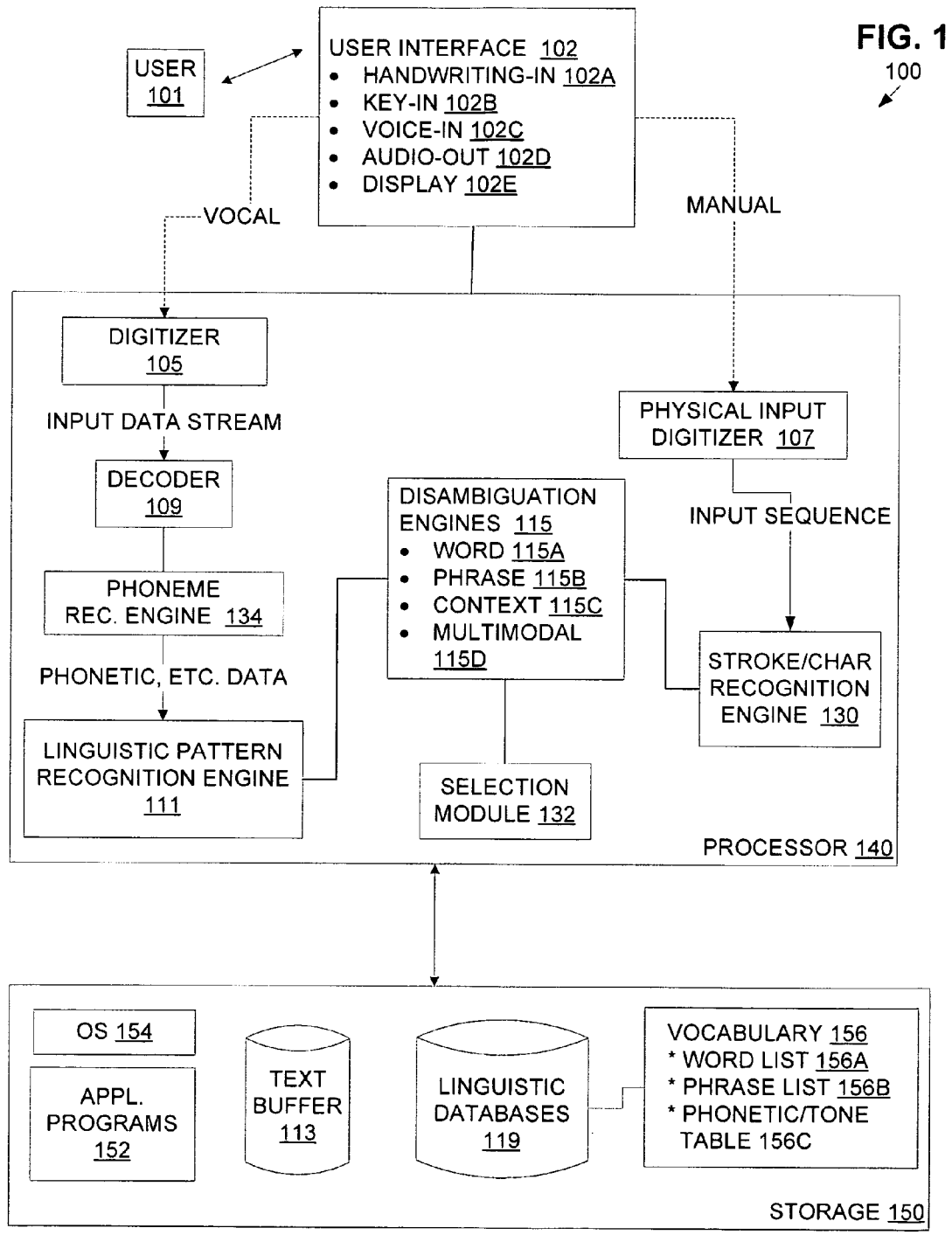
FIG. 1 is a block diagram showing some components of an exemplary system for using voice input to resolve ambiguous manually entered text input.
Figure 2:
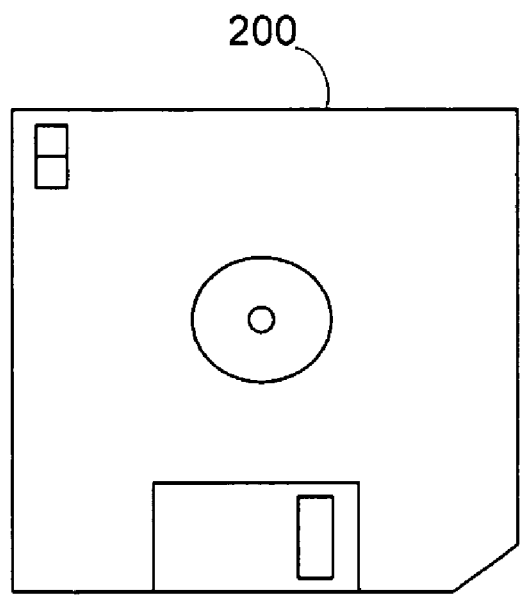
FIG. 2 is a block diagram showing an exemplary signal bearing media.

FIG. 1 illustrates an exemplary system 100 for using voice input to resolve ambiguous manually entered text input. The system 100 may be implemented as a PDA, cell phone, AM/FM radio, MP3 player, GPS, automotive computer, or virtually any other device with a reduced size keyboard or other entry facility such that users' text entry includes some inherent ambiguity. For the sake of completeness, the user is shown at 101, although the user does not actually form part of the system 100. The user 101 enters all or part of a word, phrase, sentence, or paragraph using the user interface 102. Data entry is inherently non-exact, in that each user entry could possibly represent different letters, digits, symbols, etc.

User Interface

The user interface 102 is coupled to the processor 140, and includes various components. At minimum. the interface 102 includes devices for user speech input, user manual input, and output to the user. To receive manual user input, the interface 102 may include one or more text entry tools. One example is a handwriting digitizer 102a, such as a digitizing surface. A different option of text entry tool is a key input 102b such as a telephone keypad, set of user-configurable buttons, reduced-keyset keyboard, or reduced-size keyboard where each key represents multiple alphanumeric characters. Another example of text entry tool is a soft keyboard, namely, a computer generated keyboard coupled with a digitizer, with some examples including a soft keyboard, touch-screen keyboard, overlay keyboard, auto-correcting keyboard, etc. Further examples of the key input 102b include mouse, trackball, joystick, or other non-key devices for manual text entry, and in this sense, the component name "key input" is used without any intended limitation. The use of joysticks to manually enter text is described in the following reference, which is incorporated herein in its entirety by this reference thereto. U.S. application Ser. No. 10/775,663, filed on Feb. 9, 2004 in the name of Pim van Meurs and entitled "System and Method for Chinese Input Using a Joystick." The key input 102b may include one or a combination of the foregoing components.

Inherently, the foregoing text entry tools include some ambiguity. For example, there is never perfect certainty of identifying characters entered with a handwriting input device. Similarly, alphanumeric characters entered with a reduced-key keyboard can be ambiguous, because there are typically three letters and one number associated with each most keys. Keyboards can be subject to ambiguity where characters are small or positioned close together and prone to user error.

To provide output to the user 101, the interface 102 includes an audio output 102d, such as one or more speakers. A different or additional option for user output is a display 102e such as an LCD screen, CRT, plasma display, or other device for presenting human readable alphanumerics, ideographic characters, and/or graphics.

Processor

The system 100 includes a processor 140, coupled to the user interface 102 and digital data storage 150. The processor 140 includes various engines and other processing entities, as described in greater detail below. The storage 150 contains various components of digital data, also described in greater detail below. Some of the processing entities (such as the engines 115, described below) are described with the processor 140, whereas others (such as the programs 152) are described with the storage 150. This is but one example, however, as ordinarily skilled artisans may change the implementation of any given processing entity as being hard-coded into circuitry (as with the processor 140) or retrieved from storage and executed (as with the storage 150).

The illustrated components of the processor 140 and storage 150 are described as follows:

A digitizer 105 digitizes speech from the user 101 and comprises an analog-digital converter, for example. Optionally, the digitizer 105 may be integrated with the voice-in feature 102c. The decoder 109 comprises a facility to apply an acoustic model (not shown) to convert digitized voice signals from 105, and namely users' utterances, into phonetic data. A phoneme recognition engine 134 functions to recognize phonemes in the voice input. The phoneme recognition engine may employ any techniques known in the field to provide, for example, a list of candidates and associated probability of matching for each input of phoneme. A recognition engine 111 analyzes the data from 109 based on the lexicon and/or language model in the linguistic databases 119, such analysis optionally including frequency or recency of use, surrounding context in the text buffer 113, etc. In one embodiment, the engine 111 produces one or more N-best hypothesis lists.

Another component of the system 100 is the digitizer 107. The digitizer provides a digital output based upon the handwriting input 102a. The stroke/character recognition engine 130 is a module to perform handwriting recognition upon block, cursive, shorthand, ideographic character, or other handwriting output by the digitizer 107. The stroke/character recognition engine 130 may employ any techniques known in the field to provide a list of candidates and associated probability of matching for each input for stroke and character.

The processor 140 further includes various disambiguation engines 115, including in this example, a word disambiguation engine 115a, phrase disambiguation engine 115b, context disambiguation engine 115c, and multimodal disambiguation engine 115d.

The disambiguation engines 115 determine possible interpretations of the manual and/or speech input based on the lexicon and/or language model in the linguistic databases 119 (described below), optimally including frequency or recency of use, and optionally based on the surrounding context in a text buffer 113. As an example, the engine 115 adds the best interpretation to the text buffer 113 for display to the user 101 via the display 102e. All of the interpretations may be stored in the text buffer 113 for later selection and correction, and may be presented to the user 101 for confirmation via the display 102e.

The multimodal disambiguation engine 115d compares ambiguous input sequence and/or interpretations against the best or N-best interpretations of the speech recognition from recognition engine 111 and presents revised interpretations to the user 101 for interactive confirmation via the interface 102. In an alternate embodiment, the recognition engine 111 is incorporated into the disambiguation engine 115, and mutual disambiguation occurs as an inherent part of processing the input from each modality in order to provide more varied or efficient algorithms. In a different embodiment, the functions of engines 115 may be incorporated into the recognition engine 111; here, ambiguous input and the vectors or phoneme tags are directed to the speech recognition system for a combined hypothesis search.

In another embodiment, the recognition engine 111 uses the ambiguous interpretations from multimodal disambiguation engine 115d to filter or excerpt a lexicon from the linguistic databases 119, with which the recognition engine 111 produces one or more N-best lists. In another embodiment, the multimodal disambiguation engine 115d maps the characters (graphs) of the ambiguous interpretations and/or words in the N-best list to vectors or phonemes for interpretation by the recognition engine 111.

The recognition and disambiguation engines 111, 115 may update one or more of the linguistic databases 119 to add novel words or phrases that the user 101 has explicitly spelled or compounded, and to reflect the frequency or recency of use of words and phrases entered or corrected by the user 101. This action by the engines 111, 115 may occur automatically or upon specific user direction.

In one embodiment, the engine 115 includes separate modules for different parts of the recognition and/or disambiguation process, which in this example include a word-based disambiguating engine 115a, a phrase-based recognition or disambiguating engine 115b, a context-based recognition or disambiguating engine 115c, multimodal disambiguating engine 115d, and others. In one example, some or all of the components 115a-115d for recognition and disambiguation are shared among different input modalities of speech recognition and reduced keypad input.

In one embodiment, the context based disambiguating engine 115c applies contextual aspects of the user's actions toward input disambiguation. For example, where there are multiple vocabularies 156 (described below), the engine 115c conditions selection of one of the vocabularies 156 upon selected user location, e.g. whether the user is at work or at home; the time of day, e.g. working hours vs. leisure time; message recipient; etc.

Storage

The storage 150 includes application programs 152, a vocabulary 156, linguistic database 119, text buffer 113, and an operating system 154. Examples of application programs include word processors, messaging clients, foreign language translators, speech synthesis software, etc.

The text buffer 113 comprises the contents of one or more input fields of any or all applications being executed by the device 100. The text buffer 113 includes characters already entered and any supporting information needed to re-edit the text, such as a record of the original manual or vocal inputs, or for contextual prediction or paragraph formatting.

The linguistic databases 119 include information such as lexicon, language model, and other linguistic information. Each vocabulary 156 includes or is able to generate a number of predetermined words, characters, phrases, or other linguistic formulations appropriate to the specific application of the device 100. One specific example of the vocabulary 156 utilizes a word list 156a, a phrase list 156b, and a phonetic/tone table 156c. Where appropriate, the system 100 may include vocabularies for different applications, such as different languages, different industries, e.g., medical, legal, part numbers, etc. A "word" is used to refer any linguistic object, such as a string of one or more characters or symbols forming a word, word stem, prefix or suffix, syllable, abbreviation, chat slang, emoticon, user ID or other identifier of data, URL, or ideographic character sequence. Analogously, "phrase" is used to refer to a sequence of words which may be separated by a space or some other delimiter depending on the conventions of the language or application. As discussed in greater detail below, words 156a may also include ideographic language characters, and in which cases phrases comprise phrases of formed by logical groups of such characters. Optionally, the vocabulary word and/or phrase lists may be stored in the database 119 or generated from the database 119.

In one example, the word list 156a comprises a list of known words in a language for all modalities, so that there are no differences in vocabulary between input modalities. The word list 156a may further comprise usage frequencies for the corresponding words in the language. In one embodiment, a word not in the word list 156a for the language is considered to have a zero frequency. Alternatively, an unknown or newly added word may be assigned a very small frequency of usage. Using the assumed frequency of usage for the unknown words, known and unknown words can be processed in a substantially similar fashion. Recency of use may also be a factor in computing and comparing frequencies. The word list 156a can be used with the word based recognition or disambiguating engine 115a to rank, eliminate, and/or select word candidates determined based on the result of the pattern recognition engine, e.g. the stroke/character recognition engine 130 or the phoneme recognition engine 134, and to predict words for word completion based on a portion of user inputs.

Similarly, the phrase list 156b may comprise a list of phrases that includes two or more words, and the usage frequency information, which can be used by the phrase-based recognition or disambiguation engine 115b and can be used to predict words for phrase completion.

The phonetic/tone table 156c comprises a table, linked list, database, or any other data structure that lists various items of phonetic information cross-referenced against ideographic items. The ideographic items include ideographic characters, ideographic radicals, logographic characters, lexigraphic symbols, and the like, which may be listed for example in the word list 156a. Each item of phonetic information includes pronunciation of the associated ideographic item and/or pronunciation of one or more tones, etc. The table 156c is optional, and may be omitted from the vocabulary 156 if the system 100 is limited to English language or other non-ideographic applications.

In one embodiment, the processor 140 automatically updates the vocabulary 156. In one example, the selection module 132 may update the vocabulary during operations of making/requesting updates to track recency of use or to add the exact-tap word when selected, as mentioned in greater detail below. In a more general example, during installation, or continuously upon the receipt of text messages or other data, or at another time, the processor 140 scans information files (not shown) for words to be added to its vocabulary. Methods for scanning such information files are known in the art. In this example, the operating system 154 or each application 152 invokes the text-scanning feature. As new words are found during scanning, they are added to a vocabulary module as low frequency words and, as such, are placed at the end of the word lists with which the words are associated. Depending on the number of times that a given new word is detected during a scan, it is assigned a higher priority, by promoting it within its associated list, thus increasing the likelihood of the word appearing in the word selection list during information entry. Depending on the context, such as an XML tag on the message or surrounding text, the system may determine the appropriate language to associate the new word with. Standard pronunciation rules for the current or determined language may be applied to novel words in order to arrive at their phonetic form for future recognition. Optionally, the processor 140 responds to user configuration input to cause the additional vocabulary words to appear first or last in the list of possible words, e.g. with special coloration or highlighting, or the system may automatically change the scoring or order of the words based on which vocabulary module supplied the immediately preceding accepted or corrected word or words.

In one embodiment, the vocabulary 156 also contains substitute words for common misspellings and key entry errors. The vocabulary 156 may be configured at manufacture of the device 100, installation, initial configuration, reconfiguration, or another occasion. Furthermore, the vocabulary 156 may self-update when it detects updated information via web connection, download, attachment of an expansion card, user input, or other event.

Exemplary Digital Data Processing Apparatus

As mentioned above, data processing entities described in this disclosure may be implemented in various forms. One example is a digital data processing apparatus, as exemplified by the hardware components and interconnections of the digital data processing apparatus 500 of FIG. 5.

The apparatus 500 includes a processor 502, such as a microprocessor, personal computer, workstation, controller, microcontroller, state machine, or other processing machine, coupled to digital data storage 504. In the present example, the storage 504 includes a fast-access storage 506, as well as nonvolatile storage 508. The fast-access storage 506 may comprise random access memory ("RAM"), and may be used to store the programming instructions executed by the processor 502. The nonvolatile storage 508 may comprise, for example, battery backup RAM, EEPROM, flash PROM, one or more magnetic data storage disks such as a hard drive, a tape drive, or any other suitable storage device. The apparatus 500 also includes an input/output 510, such as a line, bus, cable, electromagnetic link, or other means for the processor 502 to exchange data with other hardware external to the apparatus 500.

Despite the specific foregoing description, ordinarily skilled artisans (having the benefit of this disclosure) will recognize that the apparatus discussed above may be implemented in a machine of different construction, without departing from the scope of the invention. As a specific example, one of the components 506, 508 may be eliminated; furthermore, the storage 504, 506, and/or 508 may be provided on-board the processor 502, or even provided externally to the apparatus 500.

Signal-Bearing Media

In contrast to the digital data processing apparatus described above, a different aspect of this disclosure concerns one or more signal-bearing media tangibly embodying a program of machine-readable instructions executable by such a digital processing apparatus. In one example, the machine-readable instructions are executable to carry out various functions related to this disclosure, such as the operations described in greater detail below. In another example, the instructions upon execution serve to install a software program upon a computer, where such software program is independently executable to perform other functions related to this disclosure, such as the operations described below.

Figure 3:
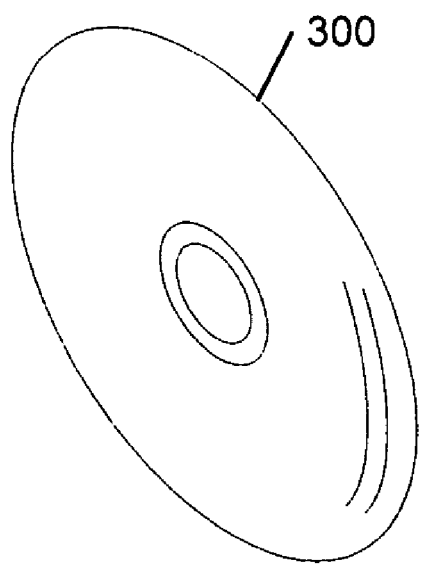
FIG. 3 is a block diagram showing a different, exemplary signal bearing medium.
Figure 5:
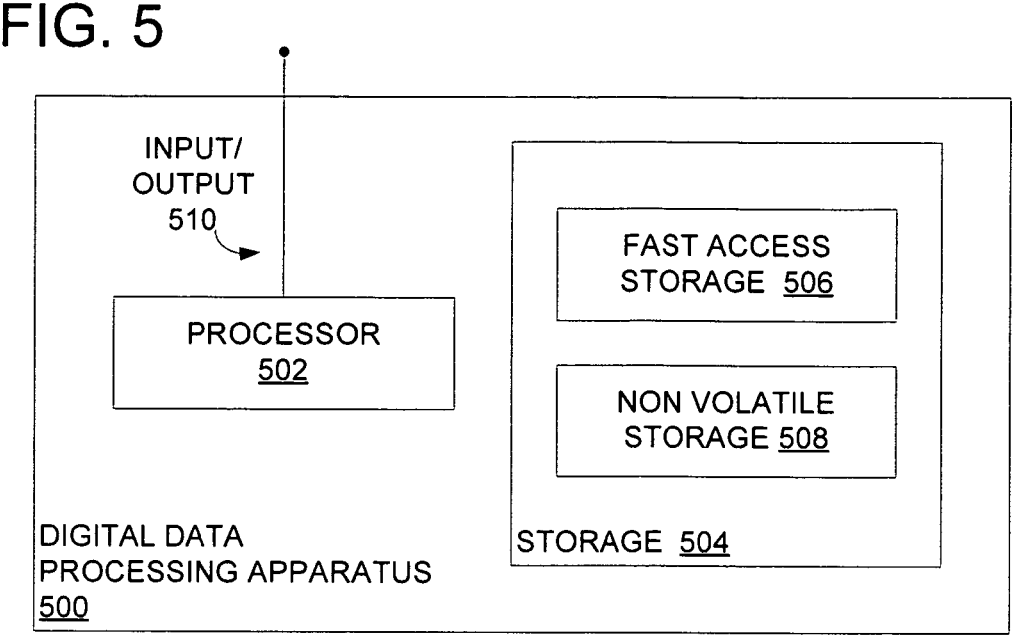
FIG. 5 is a block diagram of an exemplary digital data processing apparatus.

In any case, the signal-bearing media may take various forms. In the context of FIG. 5, such a signal-bearing media may comprise, for example, the storage 504 or another signal-bearing media, such as an optical storage disc 300 (FIG. 3), directly or indirectly accessible by a processor 502. Whether contained in the storage 506, disc 300, or elsewhere, the instructions may be stored on a variety of machine-readable data storage media. Some examples include direct access storage, e.g. a conventional hard drive, redundant array of inexpensive disks ("RAID"), or another direct access storage device ("DASD"); serial-access storage such as magnetic or optical tape, electronic non-volatile memory e.g. ROM, EPROM, flash PROM, or EEPROM; battery backup RAM, optical storage e.g. CD-ROM, WORM, DVD, digital optical tape; or other suitable signal-bearing media. In one embodiment, the machine-readable instructions may comprise software object code, compiled from a language such as assembly language, C, etc.

Logic Circuitry

Figure 4:
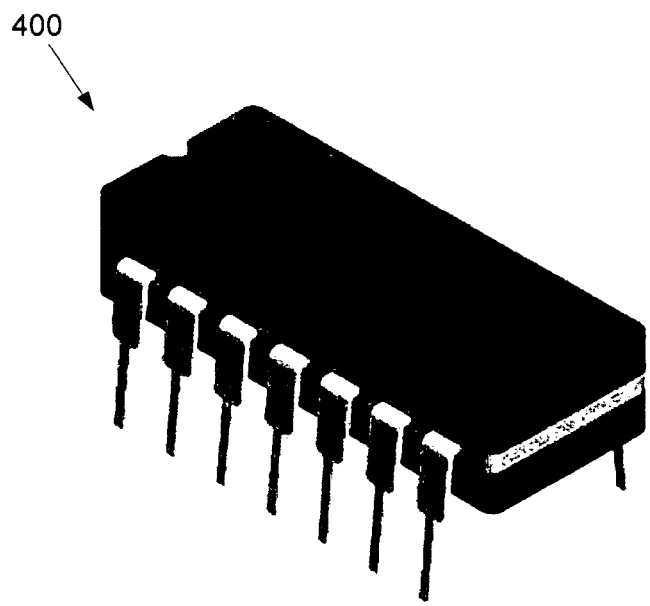
FIG. 4 is a perspective view of exemplary logic circuitry.

In contrast to the signal-bearing media and digital data processing apparatus discussed above, a different embodiment of this disclosure uses logic circuitry instead of computer-executed instructions to implement processing entities of the disclosure. Depending upon the particular requirements of the application in the areas of speed, expense, tooling costs, and the like, this logic may be implemented by constructing an application-specific integrated circuit (ASIC) having thousands of tiny integrated transistors. FIG. 4 shows one example in the form of the circuit 400. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Operation

Having described the structural features of the present disclosure, the operational aspect of the disclosure will now be described. As mentioned above, the operational aspect of the disclosure generally involves various techniques to resolve intentionally ambiguous user input entered upon a text entry tool of a handheld mobile device.

Operational Sequence

FIG. 6 shows a sequence 600 to illustrate one example of the method aspect of this disclosure. In one application, this sequence serves to resolve inherently ambiguous user input entered upon a text entry tool of a handheld digital data processing device. For ease of explanation, but without any intended limitation, the example of FIG. 6 is described in the context of the device of FIG. 1, as described above.

In step 602, the text entry tool e.g. device 102a and/or 102b, of the user interface 102 receives user input representing multiple possible character combinations. Depending upon the structure of the device, some examples of step 602 include receiving user entry via a telephone keypad where each key corresponds to multiple alphanumeric characters, or receiving input via handwriting digitizer, or receiving input via computer display and co-located digitizing surface, etc.

In step 604, independent of any other user input, the device interprets the received user input against the vocabulary 156 and/or linguistic databases 119 to yield a number of word candidates, which may also be referred to as "input sequence interpretations" or "selection list choices." As a more particular example, the word list 156a may be used.

In one embodiment, one of the engines 130, 115a, 115b processes the user input (step 604) to determine possible interpretations for the user entry so far. Each word candidate comprises one of the following:

(1) a word of which the user input forms a stem, root, syllable, or affix;

(2) a phrase of which the user input forms one or more words or parts of words; (3) a complete word represented by the user input.

Thus, the term "word" in "word candidate" is used for the sake of convenient explanation without being necessarily limited to "words" in a technical sense. In some embodiments, user inputs (step 602) for only "root" words are needed, such as for highly agglutinative languages and those with verb-centric phrase structures that append or prepend objects and subjects and other particles. Additionally, the interpretation 604 may be conducted such that (1) each candidate begins with letters corresponding to the user input, (2) each candidate includes letters corresponding to the user input, the letters occurring between starting and ending letters of the candidate, etc.

In various embodiments, such as when manual key-in 102b is an auto-correcting keyboard displayed on a touch-screen device, the interpretation 604 includes a character sequence (the unambiguous interpretation or "exact-tap" sequence) containing each character that is the best interpretation of the user's input, such as the closest character to each stylus tap, which the user may choose (in step 614) if the desired word is not already in the linguistic databases 119. In some embodiments, such as when the manual key-in 102b is a reduced keyboard such as a standard phone keypad, the unambiguous interpretation is a two-key or multi-tap interpretation of the key sequence. In some embodiments, after the user selects such the unambiguous interpretation (step 614, below), the device automatically or upon user request or confirmation adds the unambiguous interpretation to the vocabulary under direction of the selection module 132.

In one example, the interpretation step 604 places diacritics such as vowel accents upon the proper characters of each word without the user indicating that a diacritic mark is needed.

In step 606, one or more of the engines 115, 130, 115a, 115b rank the candidate words according to likelihood of representing the user's intent. The ranking operation 606 may use criteria such as: whether the candidate word is present in the vocabulary 156; frequency of use of the candidate word in general use; frequency of use of the candidate word by the user; etc. Usage frequencies and other such data for the ranking operation 606 may be obtained from the vocabulary modules 156 and/or linguistic databases 119. Step 606 is optional, and may be omitted to conserve processing effort, time, memory, etc.

In step 608, the processor 140 visibly presents the candidates at the interface 102 for viewing by the user. In embodiments where the candidates are ranked (pursuant to step 606), the presentation of step 608 may observe this ordering. Optionally, step 608 may display the top-ranked candidate so as to focus attention upon it, for example, by inserting the candidate at a displayed cursor location, or using another technique such as bold, highlighting, underline, etc.

In step 610, the processor 140 uses the display 102e or audio-out 102d to solicit the user to speak an input. Also in step 610, the processor 140 receives the user's spoken input via voice input device 102c and front-end digitizer 105. In one example, step 610 comprises an audible prompt e.g. synthesized voice saying "choose word"; visual message e.g. displaying "say phrase to select it", iconic message e.g. change in cursor appearance or turning a LED on; graphic message e.g. change in display theme, colors, or such; or another suitable prompt. In one embodiment, step 610's solicitation of user input may be skipped, in which case such prompt is implied.

In one embodiment, the device 100 solicits or permits a limited set of speech utterances representing a small number of unique inputs; as few as the number of keys on a reduced keypad, or as many as the number of unique letter forms in a script or the number of consonants and vowels in a spoken language. The small distinct utterances are selected for low confusability, resulting in high recognition accuracy, and are converted to text using word-based and/or phrase-based disambiguation engines. This capability is particularly useful in a noisy or non-private environment, and vital to a person with a temporary or permanent disability that limits use of the voice. Recognized utterances may include mouth clicks and other non-verbal sounds.

In step 612, the linguistic pattern recognition engine 111 applies speech recognition to the data representing the user's spoken input from step 610. In one example, speech recognition 612 uses the vocabulary of words and/or phrases in 156a, 156b. In another example, speech recognition 612 utilizes a limited vocabulary, such as the most likely interpretations matching the initial manual input (from 602), or the candidates displayed in step 608. Alternately, the possible words and/or phrases, or just the most likely interpretations, matching the initial manual input serve as the lexicon for the speech recognition step. This helps eliminate incorrect and irrelevant interpretations of the spoken input.

In one embodiment, step 612 is performed by a component such as the decoder 109 converting an acoustic input signal into a digital sequence of vectors that are matched to potential phones given their context. The decoder 109 matches the phonetic forms against a lexicon and language model to create an N-best list of words and/or phrases for each utterance.

The multimodal disambiguation engine 115d filters these against the manual inputs so that only words that appear in both lists are retained.

Thus, because the letters mapped to each telephone key (such as "A B C" on the "2" key) are typically not acoustically similar, the system can efficiently rule out the possibility that an otherwise ambiguous sound such as the plosive /b/ or /p/ constitutes a "p", since the user pressed the "2" key (containing "A B C") rather than the "7" key (containing "P Q R S"). Similarly, the system can rule out the "p" when the ambiguous character being resolved came from tapping the auto-correcting QWERTY keyboard in the "V B N" neighborhood rather than in the "I O P" neighborhood. Similarly, the system can rule out the "p" when an ambiguous handwriting character is closer to a "B" or "3" than a "P" or "R."

Optionally, if the user inputs more than one partial or complete word in a series, delimited by a language-appropriate input like a space, the linguistic pattern recognition engine 111 or multimodal disambiguation engine 115d uses that information as a guide to segment the user's continuous speech and looks for boundaries between words. For example, if the interpretations of surrounding phonemes strongly match two partial inputs delimited with a space, the system determines the best place to split a continuous utterance into two separate words. In another embodiment, "soundex" rules refine or override the manual input interpretation in order to better match the highest-scoring speech recognition interpretations, such as to resolve an occurrence of the user accidentally adding or dropping a character from the manual input sequence.

Step 614 is performed by a component such as the multimodal disambiguation engine 115d, selection module 132, etc. Step 614 performs one or more of the following actions. In one embodiment, responsive to the recognized speech forming an utterance matching one of the candidates, the device selects the candidate. In other words, if the user speaks one of the displayed candidates to select it. In another embodiment, responsive to the recognized speech forming an extension of a candidate, the device selects the extended candidate. As an example of this, the user speaks "nationality" when the displayed candidate list includes "national," causing the device to select "nationality." In another embodiment, responsive to the recognized speech forming a command to expand one of the candidates, the multimodal disambiguation engine 115d or one of components 115, 132 retrieves from the vocabulary 156 or linguistic databases 119 one or more words or phrases that include the candidate as a subpart and visibly presents them for the user to select from. Expansion may include words with the candidate as a prefix, suffix, root, syllable, or other subcomponent.

Optionally, the phoneme recognition engine 134 and linguistic pattern recognition engine 111 may employ known speech recognition features to improve recognition accuracy by comparing the subsequent word or phrase interpretations actually selected against the original phonetic data.

Operational Examples

Figure 7:
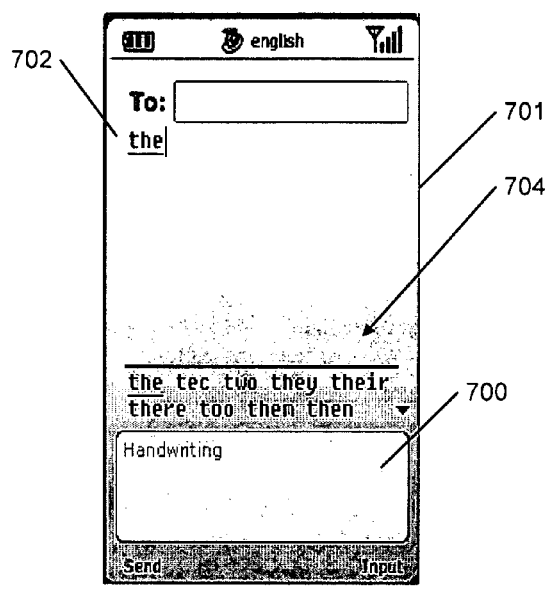
FIGS. 7-11 illustrate various examples of receiving and processing user input.

FIGS. 7-11 illustrate various exemplary scenarios in furtherance of FIG. 6. FIG. 7 illustrates contents of a display 701 (serving as an example of 102e) to illustrate the use of handwriting to enter characters and the use of voice to complete the entry. First, in step 602 the device receives the following user input: the characters "t e c", handwritten in the digitizer 700. The device 100 interprets (604) and ranks (606) the characters, and provides a visual output 702/704 of the ranked candidates. Due to limitations of screen size, not all of the candidates are presented in the list 702/704.

Even though "tec" is not a word in the vocabulary, the device includes it as one of the candidate words 704 (step 604). Namely, "tec" is shown as the "exact-tap" word choice i.e. best interpretation of each individual letter. The device 100 automatically presents the top-ranked candidate (702) in a manner to distinguish it from the others. In this example, the top-ranked candidate "the" is presented first in the list 700.

Figure 8:
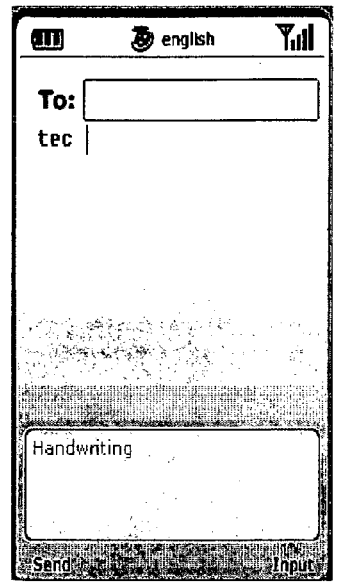

In step 610, the user speaks /tek/ in order to select the word as entered in step 602, rather than the system-proposed word "the." Alternatively, the user may utter "second" (since "tec" is second in the list 704) or another input to select "tec" from the list 704. The device 100 accepts the word as the user's choice (step 614), and enters "t-e-c" at the cursor as shown in FIG. 8. As part of step 614, the device removes presentation of the candidate list 704.

Figure 9:
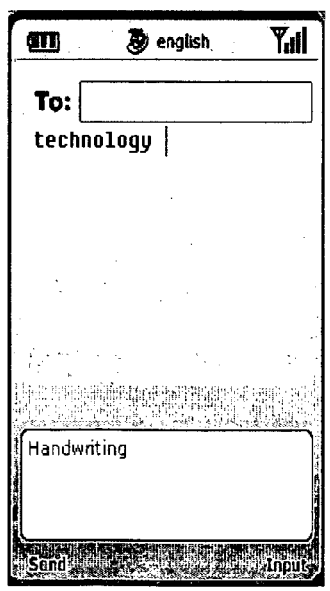

In a different embodiment, referring to FIG. 7, the user had entered "t", "e", "c" (step 602) but merely in the process of entering the full word "technology." In this embodiment, the device provides a visual output 702/704 of the ranked candidates, and automatically enters the top-ranked candidate (at 702) adjacent to a cursor as in FIG. 7. In contrast to FIG. 8, however, the user then utters (610)/teknolōjē/ in order to select this as an expansion of "tec." Although not visibly shown in the list 702/704, the word "technology" is nonetheless included in the list of candidates, and may be reached by the user scrolling through the list. Here, the user skips scrolling, utters /teknolōjē/ at which point the device accepts "technology" as the user's choice (step 614), and enters "technology" at the cursor as shown in FIG. 9. As part of step 614, the device removes presentation of the candidate list 704.

Figure 10:
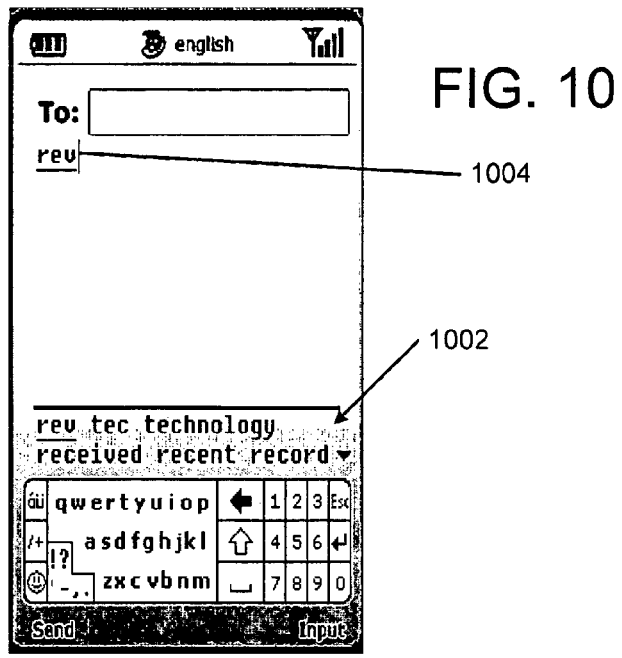

FIG. 10 describes a different example to illustrate the use of an on-screen keyboard to enter characters and the use of voice to complete the entry. The on-screen keyboard, for example, may be implemented as taught by U.S. Pat. No. 6,081,190. In the example of FIG. 10, the user taps the sequence of letters "t", "e", "c" by stylus (step 602). In response, the device presents (step 608) the word choice list 1002, namely "rev, tec, technology, received, recent, record." Responsive to user utterance (610) of a word in the list 1002 such as "technology" (visible in the list 1002) or "technical" (present in the list 1002 but not visible), the device accepts such as the user's intention (step 614) and enters the word at the cursor 1004.

Figure 11:
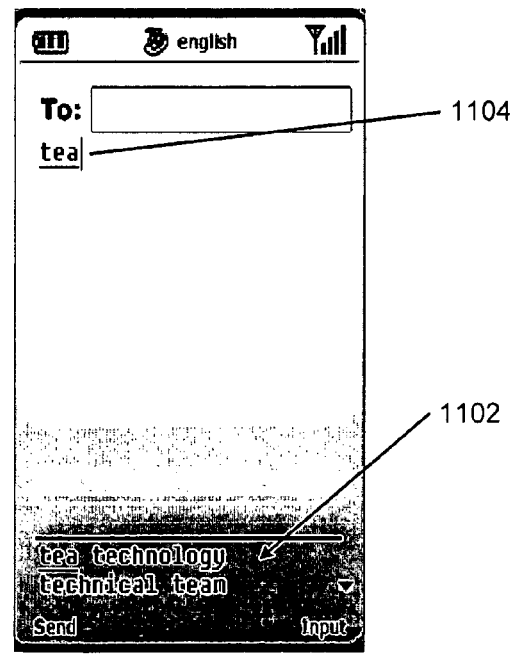

FIG. 11 describes a different example to illustrate the use of a keyboard of reduced keys (where each key corresponds to multiple alphanumeric characters) to enter characters, and the use of voice to complete the entry. In this example, the user enters (step 602) hard keys 8 3 2, indicating the sequence of letters "t", "e", "c." In response, the device presents (step 608) the word choice list 1102. Responsive to user utterance (610) of a word in the list 1102 such as "technology" (visible in the list 1102) or "teachers" (present in the list 1102 but not visible), the device accepts such as the user's intention (step 614) and enters the selected word at the cursor 1104.

Example for Ideographic Languages

Broadly, many aspects of this disclosure are applicable to text entry systems for languages written with ideographic characters on devices with a reduced keyboard or handwriting recognizer. For example, pressing the standard phone key "7" (where the Pinyin letters "P Q R S" are mapped to the "7" key) begins entry of the syllables "qing" or "ping"; after speaking the desired syllable /tsing/, the system is able to immediately determine that the first grapheme is in fact a "q" rather than a "p". Similarly, with a stroke-order input system, after the user presses one or more keys representing the first stroke categories for the desired character, the speech recognition engine can match against the pronunciation of only the Chinese characters beginning with such stroke categories, and is able to offer a better interpretation of both inputs. Similarly, beginning to draw one or more characters using a handwritten ideographic character recognition engine can guide or filter the speech interpretation or reduce the lexicon being analyzed.

Though an ambiguous stroke-order entry system or a handwriting recognition engine may not be able to determine definitively which handwritten stroke was intended, the combination of the stroke interpretation and the acoustic interpretation sufficiently disambiguates the two modalities of input to offer the user the intended character. In one embodiment of this disclosure, the speech recognition step is used to select the character, word, or phrase from those displayed based on an input sequence in a conventional stroke-order entry or handwriting system for ideographic languages. In another embodiment, the speech recognition step is used to add tonal information for further disambiguation in a phonetic input system. The implementation details related to ideographic languages are discussed in greater detail as follows.

FIG. 12 shows a sequence 1200 to illustrate another example of the method aspect of this disclosure. This sequence serves to resolve inherently ambiguous user input in order to aid in user entry of words and phrases comprised of ideographic characters. Although the term "ideographic" is used in these examples, the operations 1200 may be implemented with many different logographic, ideographic, lexigraphic, morpho-syllabic, or other such writing systems that use characters to represent individual words, concepts, syllables, morphemes, etc. The notion of ideographic characters herein is used without limitation, and shall include the Chinese pictograms, Chinese ideograms proper, Chinese indicatives, Chinese sound-shape compounds (phonologograms), Japanese characters (Kanji), Korean characters (Hanja), and other such systems. Furthermore, the system 100 may be implemented to a particular standard, such as traditional Chinese characters, simplified Chinese characters, or another standard. For ease of explanation, but without any intended limitation, the example of FIG. 12 is described in the context of FIG. 1, as described above.

In step 1202, one of the input devices 102a/102b receives user input used to identify one or more intended ideographic characters or subcomponents. The user input may specify handwritten strokes, categories of handwritten strokes, phonetic spelling, tonal input; etc. Depending upon the structure of the device 100, this action may be carried out in different ways. One example involves receiving user entry via a telephone keypad (102b) where each key corresponds to a stroke category. For example, a particular key may represent all downward-sloping strokes. Another example involves receiving user entry via handwriting digitizer (102a) or a directional input device of 102 such as a joystick where each gesture is mapped to a stroke category. In one example, step 1202 involves the interface 102 receiving the user making handwritten stroke entries to enter the desired one or more ideographic characters. As still another option, step 1202 may be carried out by an auto-correcting keyboard system (102b) for a touch-sensitive surface or an array of small mechanical keys, where the user enters approximately some or all of the phonetic spelling, components, or strokes of one or more ideographic characters.

Various options for receiving input in step 1202 are described by the following reference documents, each incorporated herein by reference. U.S. application Ser. No. 10/631,543, filed on Jul. 30, 2003 and entitled "System and Method for Disambiguating Phonetic Input." U.S. application Ser. No. 10/803,255 filed on Mar. 17, 2004 and entitled "Phonetic and Stroke Input Methods of Chinese Characters and Phrases." U.S. Application No. 60/675,059 filed Apr. 25, 2005 and entitled "Word and Phrase Prediction System for Handwriting." U.S. application Ser. No. 10/775,483 filed Feb. 9, 2004 and entitled "Keyboard System with Automatic Correction." U.S. application Ser. No. 10/775,663 filed Feb. 9, 2004 and entitled "System and Method for Chinese Input Using a Joystick."

Also in step 1202, independent of any other user input, the device interprets the received user input against a first vocabulary to yield a number of candidates each comprising at least one ideographic character. More particularly, the device interprets the received strokes, stroke categories, spellings, tones, or other manual user input against the character listing from the vocabulary 156 (e.g., 156a), and identifies resultant candidates in the vocabulary that are consistent with the user's manual input. Step 1202 may optionally perform pattern recognition and/or stroke filtering, e.g. on handwritten input, to identify those candidate characters that could represent the user's input thus far.

In step 1204, which is optional, the disambiguation engines 115 order the identified candidate characters (from 1202) based on the likelihood that they represent what the user intended by his/her entry. This ranking may be based on information such as: (1) general frequency of use of each character in various written or oral forms, (2) the user's own frequency or recency of use, (3) the context created by the preceding and/or following characters, (4) other factors. The frequency information may be implicitly or explicitly stored in the linguistic databases 119 or may be calculated as needed.

In step 1206, the processor 140 causes the display 102e to visibly present some or all of the candidates (from 1202 or 1204) depending on the size and other constraints of the available display space. Optionally, the device 100 may present the candidates in the form of a scrolling list.

In one embodiment, the display action of step 1206 is repeated after each new user input, to continually update (and in most cases narrow) the presented set of candidates (1204, 1206) and permit the user to either select a candidate character or continue the input (1202). In another embodiment, the system allows input (1202) for an entire word or phrase before displaying any of the constituent characters are displayed (1206).

In one embodiment, the steps 1202, 1204, 1206 may accommodate both single and multi-character candidates. Here, if the current input sequence represents more than one character in a word or phrase, then the steps 1202, 1204, and 1206 identify, rank, and display multi-character candidates rather than single character candidates. To implement this embodiment, step 1202 may recognize prescribed delimiters as a signal to the system that the user has stopped his/her input, e.g. strokes, etc., for the preceding character and will begin to enter them for the next character. Such delimiters may be expressly entered (such as a space or other prescribed key) or implied from the circumstances of user entry (such as by entering different characters in different displayed boxes or screen areas).

Without invoking the speech recognition function (described below), the user may proceed to operate the interface 102 (step 1212) to accept one of the selections presented in step 1206. Alternatively, if the user does not make any selection (1212), then step 1206 may automatically proceed to step 1208 to receive speech input. As still another option, the interface 102 in step 1206 may automatically prompt the user to speak with an audible prompt, visual message, iconic message, graphic message, or other prompt. Upon user utterance, the sequence 1200 passes from 1206 to 1208. As still another alternative, the interface 102 may require (step 1206) the user to press a "talk" button or take other action to enable the microphone and invoke the speech recognition step 1208. In another embodiment, the manual and vocal inputs are nearly simultaneous or overlapping. In effect, the user is voicing what he or she is typing.

In step 1208, the system receives the user's spoken input via front-end digitizer 105 and the linguistic pattern recognition engine 111 applies speech recognition to the data representing the user's spoken input. In one embodiment, the linguistic pattern recognition engine 111 matches phonetic forms against a lexicon of syllables and words (stored in linguistic databases 119) to create an N-best list of syllables, words, and/or phrases for each utterance. In turn, the disambiguation engines 115 use the N-best list to match the phonetic spellings of the single or multi-character candidates from the stroke input, so that only the candidates whose phonetic forms also appear in the N-best list are retained (or become highest ranked in step 1210). In another embodiment, the system uses the manually entered phonetic spelling as a lexicon and language model to recognize the spoken input.

In one embodiment, some or all of the inputs from the manual input modality represent only the first letter of each syllable or only the consonants of each word. The system recognizes and scores the speech input using the syllable or consonant markers, filling in the proper accompanying letters or vowels for the word or phrase. For entry of Japanese text, for example, each keypad key is mapped to a consonant row in a 50 sounds table and the speech recognition helps determine the proper vowel or "column" for each syllable. In another embodiment, some or all of the inputs from the manual input modality are unambiguous. This may reduce or remove the need for the word disambiguation engine 115a in FIG. 1, but still requires the multimodal disambiguation engine 115d to match the speech input, in order to prioritize the desired completed word or phrase above all other possible completions or to identify intervening vowels.

Further, in some languages, such as Indic languages, the vocabulary module may employ templates of valid sub-word sequences to determine which word component candidates are possible or likely given the preceding inputs and the word candidates being considered. In other languages, pronunciation rules based on gender help further disambiguate and recognize the desired textual form.

Step 1208 may be performed in different ways. In one option, when the recognized speech forms an utterance including pronunciation of one of the candidates from 1206, the processor 102 selects that candidate. In another option, when the recognized speech forms an utterance including pronunciation of phonetic forms of any candidates, the processor updates the display (from 1206) to omit characters other than those candidates. In still another option, when the recognized speech is an utterance potentially pronouncing any of a subset of the candidates, the processor updates the display to omit others than the candidates of the subset. In another option, when the recognized speech is an utterance including one or more tonal features corresponding to one or more of the candidates, the processor 102 updates the display (from 1206) to omit characters other than those candidates.

After step 1208, step 1210 ranks the remaining candidates according to factors such as the speech input. For example, the linguistic pattern recognition engine 111 may provide probability information to the multimodal disambiguation engine 115d so that the most likely interpretation of the stroke or other user input and of the speech input is combined with the frequency information of each character, word, or phrase to offer the most likely candidates to the user for selection. As additional examples, the ranking (1210) may include different or additional factors such as: the general frequency of use of each character in various written or oral forms; the user's own frequency or recency of use; the context created by the preceding and/or following characters; etc.

After step 1210, step 1206 repeats in order to display the character/phrase candidates prepared in step 1210. Then, in step 1212, the device accepts the user's selection of a single-character or multi-character candidate, indicated by some input means 102a/102c/102b such as tapping the desired candidate with a stylus. The system may prompt the user to make a selection, or to input additional strokes or speech, through visible, audible, or other means as described above.

In one embodiment, the top-ranked candidate is automatically selected when the user begins a manual input sequence for the next character. In another embodiment, if the multimodal disambiguation engine 115d identifies and ranks one candidate above the others in step 1210, the system 100 may proceed to automatically select that candidate in step 1212 without waiting for further user input. In one embodiment, the selected ideographic character or characters are added at the insertion point of a text entry field in the current application and the input sequence is cleared. The displayed list of candidates may then be populated with the most likely characters to follow the just-selected character(s).

Other Embodiments

While the foregoing disclosure shows a number of illustrative embodiments, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a wireless communications device. In the alternative, the processor and the storage medium may reside as discrete components in a wireless communications device.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A digital data processing device programmed to perform operations of resolving ambiguous user input received via manually operated text entry tool, the operations comprising:
via manually operated text entry tool, receiving hand entered user input representing a user-intended text object, where the user input is ambiguous because the user input as received represents multiple different text combinations;
independent of any other user input, interpreting the received user input against a text vocabulary to produce multiple interpretation candidates corresponding to the user-intended text object, the candidates occurring in one or more of the following types: (1) a word of which the user input forms one of: a root, stem, syllable, affix, (2) a phrase of which the user input forms a word: (3) a word represented by the user input;
presenting results of the interpreting operation for viewing by the user, said results including a list of said candidates corresponding to the user-intended text object;
responsive to the device receiving spoken user input, performing speech recognition of the spoken user input;
performing one or more actions of a group of actions including:
responsive to the recognized speech comprising an utterance specifying one of the candidates, visibly providing a text output comprising the specified candidate.

2. The device of claim 1, where the group of actions further comprises:
responsive to the recognized speech specifying an extension of a candidate, visibly providing a text output comprising the specified extension of said candidate.

3. The device of claim 1, where the group of actions further comprises at least one of the following:
responsive to the recognized speech comprising a command to expand one of the candidates, searching a vocabulary for entries that include said candidate as a subpart, and visibly presenting one or more entries found by the search;
responsive to the recognized speech forming an expand command, visibly presenting at least one of the following as to one or more candidates in the list: word completion, affix addition, phrase completion, additional words having the same root as the candidate.

4. The device of claim 1, where the group of actions further comprises:
comparing the list of the candidates with a list of possible outcomes from the speech recognition operation to identify any entries occurring in both lists;
visibly presenting a list of the identified entries.

5. The device of claim 1, the group of actions further including:
responsive to recognized speech comprising an utterance potentially pronouncing any of a subset of the candidates, visibly presenting a list of candidates in the subset.

6. The device of claim 1, where the operation of performing speech recognition comprises:
performing speech recognition of the spoken user input utilizing a vocabulary;
redefining the candidates to omit candidates not represented by results of the speech recognition operation;
visibly presenting a list of the redefined candidates.

7. The device of claim 1, where the operation of performing speech recognition comprises:
performing speech recognition of the spoken user input utilizing a vocabulary substantially limited to said candidates.

8. The device of claim 1, the interpreting operation performed such that each candidate begins with letters corresponding to the user input.

9. The device of claim 1, the interpreting operation performed such that a number of the candidates are words including letters representing the user input in other than starting and ending positions in the words.

10. The device of claim 1, the interpreting operation conducted such that the types of candidates further include strings of alphanumeric text.

11. The device of claim 1, the interpreting operation conducted such that the types further include at least one of: ideographic characters, phrases of ideographic characters.

12. A digital data processing device, comprising:
user-operated means for manual text entry;
display means for visibly presenting computer generated images;
processing means for performing operations comprising:
via user-operated means, receiving hand entered user input representing a user-intended text object, where the user input is ambiguous because the user input as received represents multiple different text combinations;
independent of any other user input interpreting the received user input against a text vocabulary to Produce multiple interpretation candidates corresponding to the user-intended text object, the candidates occurring in one or more of the following types: (1) a word of which the user input forms one of: a root, stem, syllable, affix, (2) a phrase of which the user input forms a word: (3) a word represented by the user input:

operating the display means to visibly present results of the interpreting operation, said results including a list of said candidates corresponding to the user-intended text object:

responsive to receiving spoken user input, performing speech recognition of the spoken user input;

performing one or more actions of a group of actions including:

responsive to the recognized speech comprising an utterance of specifying one of the candidates, operating the display means to visibly present text output comprising the specified candidate.

13. Circuitry of multiple interconnected electrically conductive elements configured to operate a digital data processing device to perform operations for resolving ambiguous user input received via manually operated text entry tool, the operations comprising:

via manually operated text entry tool, receiving hand entered user input representing a user-intended text object, where the user input is ambiguous because the user input as received represents multiple different text combinations:

independent of any other user input, interpreting the received user input against a text vocabulary to produce multiple interpretation candidates corresponding to the user-intended text object, the candidates occurring in one or more of the following types: (1) a word of which the user input forms one of: a root, stem, syllable, affix, (2) a phrase of which the user input forms a word: (3) a word represented by the user input:

presenting results of the interpreting operation for viewing by the user, said results including a list of said candidates corresponding to the user-intended text object:

responsive to receiving spoken user input, performing speech recognition of the spoken user input;

performing one or more actions of a group of actions including:

responsive to the recognized speech comprising an utterance of specifying one of the candidates, visibly providing a text output comprising the specified candidate.

14. A digital data processing device programmed to perform operations for resolving inherently ambiguous user input received via manually operated text entry tool, the operations comprising:

via manually operated text entry tool, receiving hand entered user input representing a user-intended text object, where the user input is ambiguous because the user input as received represents multiple different text combinations, where the user input represents at least one of the following: handwritten strokes, categories of handwritten strokes, phonetic spelling, tonal input;

independent of any other user input, interpreting the received user input against a text vocabulary to produce multiple interpretation candidates corresponding to the user-intended text object where each candidate comprises one or more of the following: one or more ideographic characters, one or more ideographic radicals of ideographic characters:

presenting results of the interpreting operation for viewing by the user, said results including a list of said candidates corresponding to the user-intended text object;

responsive to receiving spoken user input, performing speech recognition of the spoken user input;

performing one or more actions of a group of actions including:

responsive to the recognized speech comprising an utterance specifying one of the candidates, visibly providing a text output comprising the specified candidate.

15. The device of claim 14, where the group of actions further comprises:

responsive to the recognized speech specifying an extension of a candidate, visibly providing a text output comprising the specified extension of said candidate.

16. The device of claim 14, where the group of actions further comprises:

responsive to the recognized speech comprising a command to expand one of the candidates, searching a vocabulary for entries that include said candidate as a subpart, and visibly presenting one or more entries found by the search.

17. The device of claim 14, the group of actions further including:

determining if the recognized speech includes one of the following: a pronunciation including one of the candidates along with other vocalizations, an expansion of one of the candidates, a variation of one of the candidates;

if so, visibly presenting a corresponding one of at least one of the following: expansions of the candidate, variations of the candidate.

18. The device of claim 14, where the group of actions further comprises:

comparing a list of the candidates with a list of possible outcomes from the speech recognition operation to identify any entries occurring in both lists;

visibly presenting a list of the identified entries.

19. The device of claim 14, the group of actions further including:

responsive to recognized speech comprising an utterance potentially pronouncing any of a subset of the candidates, visibly presenting a list of candidates in the subset.

20. The device of claim 14, the group of actions further including:

responsive to recognized speech comprising a phonetic input exclusively corresponding to a subset of the candidates, visibly presenting a list of candidates in the subset.

21. The device of claim 14, where:

the device further includes digital data storage including at least one data structure including multiple items of phonetic information and cross-referencing each item of phonetic information with one or more ideographic items, each ideographic item including at least one of the following: one or more ideographic characters, one or more ideographic radicals;

where each item of phonetic information comprises one of the following: pronunciation of one or more ideographic items, pronunciation of one or more tones associated with one or more ideographic items;

the operation of performing speech recognition of the spoken user input further comprises searching the data structure according to phonetic information of the recognized speech in order to identify one or more cross-referenced ideographic items.

22. The device of claim 14, where the operation of performing speech recognition comprises:
  performing speech recognition of the spoken user input utilizing a vocabulary substantially limited to said candidates.

23. A digital data processing device, comprising:
  user-operated means for manual text entry;
  display means for visibly presenting computer generated images;
  processing means for performing operations comprising:
    via the user-operated means, receiving hand entered user input representing a user-intended text object, where the user input is ambiguous because the user input as received represents multiple different text combinations, where the user input represents at least one of the following: handwritten strokes, categories of handwritten strokes, phonetic spelling, tonal input;
    independent of any other user input, interpreting the received user input against a text vocabulary to produce multiple interpretation candidates corresponding to the user-intended text object, where each candidate comprises one or more of the following: one or more ideographic characters, one or more ideographic radicals of ideographic characters;
    causing the display means to present results of the interpreting operation, said results including a list of said candidates corresponding to the user-intended text object;
    responsive to the speech entry equipment receiving spoken user input, performing speech recognition of the spoken user input;
    performing one or more actions of a group of actions including:
      responsive to the recognized speech comprising an utterance specifying in one of the candidates, causing the display means to provide an output comprising the specified candidate.

24. Circuitry of multiple interconnected electrically conductive elements configured to operate a digital data processing device to perform operations for resolving ambiguous user input received via manually operated text entry tool, the operations comprising:
  via manually operated text entry tool, receiving hand entered user input representing a user-intended text object, where the user input is ambiguous because the user input as received represents multiple different text combinations, where the user input represents at least one of the following: handwritten strokes, categories of handwritten strokes, phonetic spelling, tonal input;
  independent of any other user input, interpreting the received user input against a text vocabulary to produce multiple interpretation candidates corresponding to the user-intended text object, where each candidate comprises one or more of the following: one or more ideographic characters, one or more ideographic radicals of ideographic characters;
  presenting results of the interpreting operation for viewing by the user, said results including a list of said candidates corresponding to the user-intended text object;
  responsive to the speech entry equipment receiving spoken user input, performing speech recognition of the spoken user input;
  performing one or more actions of a group of actions including:
    responsive to the recognized speech comprising an utterance specifying one of the candidates, visibly providing a text output comprising the specified candidate.

25. A digital data processing apparatus programmed to perform operations of resolving inherently ambiguous user input received via manually operated text entry tool, the operations comprising:
  via manually operated text entry tool, receiving user input that is inherently ambiguous because the user input concurrently it represents multiple different possible combinations of text;
  independent of any other user input, identifying in a predefined text vocabulary all entries corresponding to any of the different possible combinations of text, as follows: (1) a vocabulary entry is a word of which the user input forms one of: a root, stem, syllable, affix, (2) a vocabulary entry is a phrase of which the user input forms a word; (3) a vocabulary entry is a word represented by the user input;
  visibly presenting a list of the identified entries of the vocabulary for viewing by the user;
  after visibly presenting the list, responsive to the device receiving spoken user input, performing speech recognition of the spoken user input and then responsive to the recognized speech comprising an utterance specifying one of the visibly presented entries, visibly providing an output comprising the specified entry.

26. A digital data processing apparatus programmed to perform operations of resolving inherently ambiguous user input received via manually operated text entry tool, the operations comprising:
  via manually operated text entry tool, receiving user input that is inherently ambiguous because the user input concurrently it represents multiple different possible combinations of at least one of the following: handwritten strokes, categories of handwritten strokes, phonetic spelling, tonal input;
  independent of any other user input, identifying in a predefined text vocabulary all entries corresponding to the different possible combinations, as follows: (1) a vocabulary entry is at least one ideographic character and the user input forms all or a part of the ideographic character, (2) a vocabulary entry is one or more ideographic radicals of ideographic characters, and the user input forms all or a part of the one or more ideographic radicals;
  visibly presenting a list of the identified entries of the vocabulary for viewing by the user;
  after visibly presenting the list, responsive to the device receiving spoken user input, performing speech recognition of the spoken user input and then responsive to the recognized speech comprising an utterance specifying one of the visibly presented entries, visibly providing an output comprising the specified entry.

* * * * *

UNITED STATES PATENT AND TRADEMARK OFFICE
CERTIFICATE OF CORRECTION

PATENT NO. : 7,720,682 B2
APPLICATION NO. : 11/350234
DATED : May 18, 2010
INVENTOR(S) : Stephanick et al.

Page 1 of 1

It is certified that error appears in the above-identified patent and that said Letters Patent is hereby corrected as shown below:

Col. 21; Claim 23, line 30, change "the speech entry equipment" to --speech entry equipment--;

Col. 22; Claim 24, line 1, change "the speech entry equipment" to --speech entry equipment--;

Col. 22; Claim 25, line 27, change "the device" to --the apparatus--; and

Col. 22; Claim 26, line 54, change "the device" to --the apparatus--.

Signed and Sealed this
Fifteenth Day of February, 2011

David J. Kappos
*Director of the United States Patent and Trademark Office*